US011449606B1

United States Patent
Satpathy et al.

(10) Patent No.: US 11,449,606 B1
(45) Date of Patent: Sep. 20, 2022

(54) MONITORING CIRCUIT INCLUDING CASCADED S-BOXES FOR FAULT INJECTION ATTACK PROTECTION

(71) Applicant: Facebook Technologies, LLC, Menlo Park, CA (US)

(72) Inventors: Sudhir Satpathy, Redmond, WA (US); Wojciech Stefan Powiertowski, Kirkland, WA (US); Nagendra Gupta Modadugu, San Francisco, CA (US); Neeraj Upasani, Sammamish, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 59 days.

(21) Appl. No.: 17/248,310

(22) Filed: Jan. 19, 2021

Related U.S. Application Data

(60) Provisional application No. 63/130,234, filed on Dec. 23, 2020.

(51) Int. Cl.
| | |
|---|---|
| *G06F 21/55* | (2013.01) |
| *G06F 11/30* | (2006.01) |
| *G06F 11/34* | (2006.01) |
| *G06F 11/07* | (2006.01) |
| *G06F 13/40* | (2006.01) |

(Continued)

(52) U.S. Cl.
CPC .......... *G06F 21/554* (2013.01); *G06F 11/076* (2013.01); *G06F 11/0742* (2013.01);
(Continued)

(58) Field of Classification Search
CPC .. G06F 21/554; G06F 11/0742; G06F 11/076; G06F 11/0772; G06F 11/3013;
(Continued)

(56) References Cited

U.S. PATENT DOCUMENTS

| | | | | |
|---|---|---|---|---|
| 6,961,427 B1 * | 11/2005 | Qiu | ....................... | H04L 9/0668 380/46 |
| 7,949,883 B2 * | 5/2011 | Shu | ..................... | G06F 9/30101 726/22 |

(Continued)

FOREIGN PATENT DOCUMENTS

| | | | | |
|---|---|---|---|---|
| CN | 109644125 A | * | 8/2017 | ............... H04L 9/06 |
| EP | 3106978 A1 | * | 12/2016 | ............... G06F 7/58 |

OTHER PUBLICATIONS

English translation of CN 109644125A, Aug. 2017, p. 1-3.*

(Continued)

*Primary Examiner* — Christopher A Revak
(74) *Attorney, Agent, or Firm* — Shumaker & Sieffert, P.A.

(57) ABSTRACT

Systems on a chip (SoCs) include security logic configured to increase resistance to fault injection attacks (FIAs). The security logic includes a monitoring circuit and a cascaded series of substitution-boxes (S-Boxes) having a circuit delay that is designed to match (or most closely match) the computing device critical path length. The monitoring circuit monitors the number of iterations required for the cascaded series of S-Boxes to return to an initial value and generates an error signal if the monitored loop length is different from the expected loop length. In some examples, the error signal is received by a mitigation processor that executes one or more processes aimed at mitigating the attack.

20 Claims, 15 Drawing Sheets

(51) Int. Cl.
*G06T 19/00* (2011.01)
*H04L 9/06* (2006.01)
*G06F 7/58* (2006.01)
*G06F 1/16* (2006.01)

(52) U.S. Cl.
CPC ...... *G06F 11/0772* (2013.01); *G06F 11/3013* (2013.01); *G06F 11/3495* (2013.01); *G06F 13/4027* (2013.01); *G06F 1/163* (2013.01); *G06F 7/588* (2013.01); *G06F 2221/034* (2013.01); *G06T 19/00* (2013.01); *H04L 9/0631* (2013.01); *H04L 2209/12* (2013.01)

(58) Field of Classification Search
CPC .. G06F 11/3495; G06F 13/4027; G06F 1/163; G06F 7/588; G06F 2221/034; G06T 19/00; H04L 9/0631; H04L 2209/12
See application file for complete search history.

(56) References Cited

U.S. PATENT DOCUMENTS

| | | | | |
|---|---|---|---|---|
| 10,862,680 | B2 * | 12/2020 | Nemiroff | H04L 9/302 |
| 2002/0124033 | A1 * | 9/2002 | Takahashi | G06F 7/58 |
| | | | | 708/250 |
| 2003/0081772 | A1 * | 5/2003 | Blaker | H04L 9/065 |
| | | | | 380/42 |
| 2005/0232416 | A1 * | 10/2005 | Sonnekalb | H04L 9/003 |
| | | | | 380/46 |
| 2015/0199174 | A1 * | 7/2015 | Boehl | G06F 7/58 |
| | | | | 708/250 |
| 2017/0063523 | A1 * | 3/2017 | Bruneau | G09C 1/00 |
| 2018/0062830 | A1 * | 3/2018 | Baker | G06F 21/602 |
| 2019/0268134 | A1 * | 8/2019 | Fronte | H04L 9/0631 |
| 2019/0268136 | A1 * | 8/2019 | Ordas | H04L 9/0631 |
| 2021/0011556 | A1 | 1/2021 | Atlas et al. | |

OTHER PUBLICATIONS

"Announcing the Advanced Encryption Standard (AES)," Federal Information Processing Standards Publication 197, Nov. 26, 2001, 51 pp.
"SMS4 Encryption Algorithm for Wireless Networks," Version 1.03, May 15, 2008, 6 pp. (translated by DIFFIE et al.).
Aoki et al., "Specification of Camellia—a 128-bit Block Cipher," NTT and Mitsubishi Electric Corporation, Sep. 26, 2001, 35 pp.

* cited by examiner

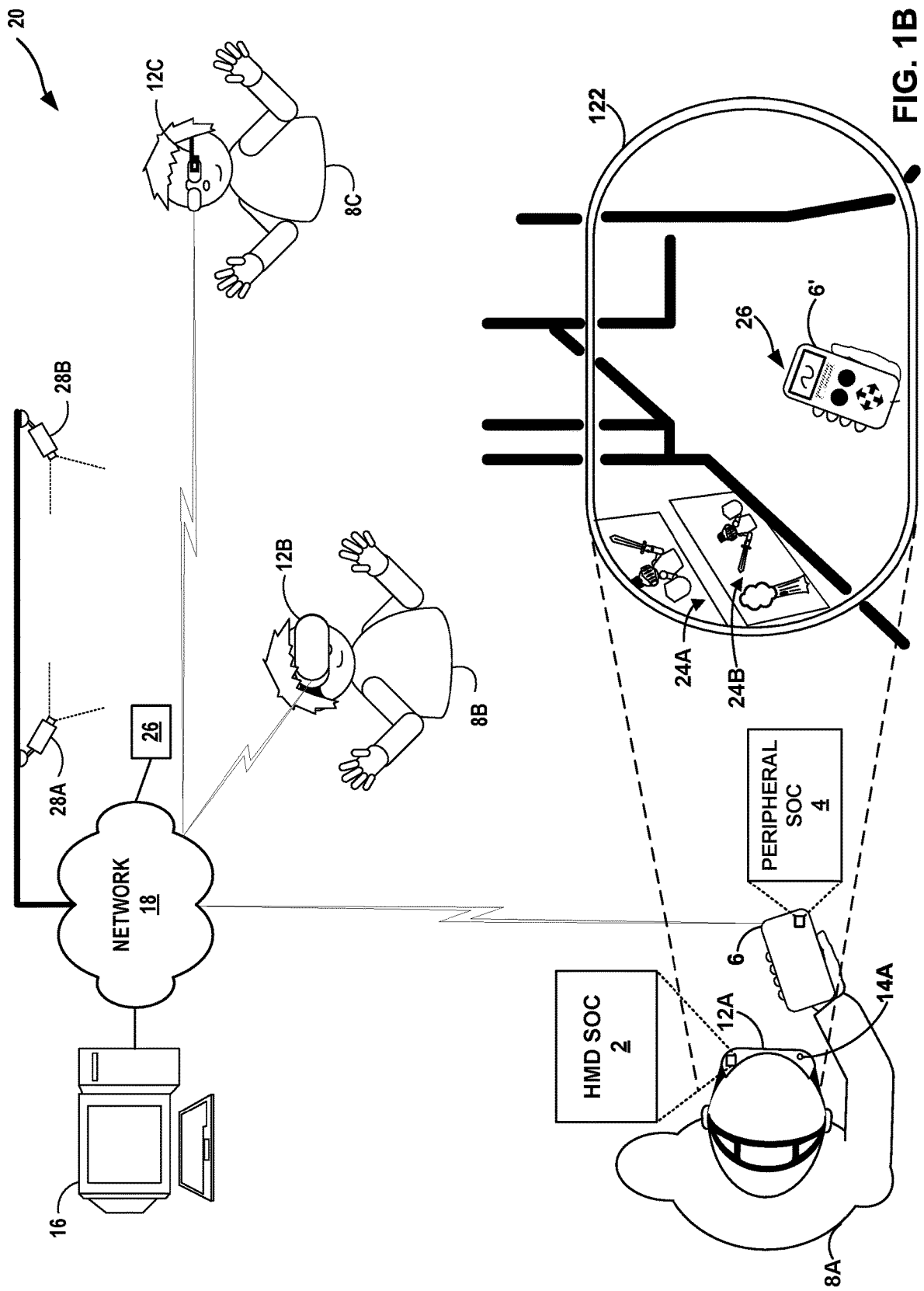

|  | 0 | 1 | 2 | 3 | ... | ... | e | f |
|---|---|---|---|---|---|---|---|---|
| 0 | 63 | 7c | 77 | 7b | ... | ... | dc | 76 |
| 1 | ca | 90 | 90 | 90 | ... | ... | 90 | c0 |
| 2 | b7 | 48 | 48 | 48 | ... | ... | 48 | 15 |
| 3 | 04 | 32 | 93 | cd | ... | ... | f3 | d4 |
| ... | | | | | | | | |
| e | e1 | 45 | 6a | 7b | ... | ... | 33 | 89 |
| f | d1 | 91 | 7a | c4 | ... | ... | a3 | 21 |

LUT(256×8b)

|  | AES |
|---|---|
| Field | $GF(2^8)$ |
| Sbox | $A.x^{-1} + C$ |
| Inv. Sbox | $(A^{-1}.x + A^{-1}.C)^{-1}$ |
| Sbox/rnd | 16 |
| Sbox/key | 4 |

FIG. 7C

Extension-field polynomial
$x^2 + \alpha x + \beta$, $\alpha=\{0..F\}$, $\beta=\{0..F\}$ $\alpha = 0x2$ $\alpha = 0xF$ $\beta = 0x2$ $\beta = 0xF$ under US 11,449,606 B1

MONITORING CIRCUIT INCLUDING CASCADED S-BOXES FOR FAULT INJECTION ATTACK PROTECTION

This application claims the benefit of U.S. Provisional Application No. 63/130,234, which was filed on Dec. 23, 2020 and which the entire contents thereof is incorporated herein by reference.

TECHNICAL FIELD

This disclosure generally relates to security measures that may be implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g., wirelessly or in tethered fashion) to a peripheral device that performs one or more artificial reality-related functions.

SUMMARY

Certain types of computing devices can be vulnerable to attack mechanisms that rely on gleaning information about or disabling one or more security functions. An example of such an attack mechanism is a so-called "fault injection attack" or FIA. The objective of an FIA is to alter the correct functioning of a computing device, thereby leading to the reduction or disabling of security features or countermeasures. Types of FIAs include voltage glitching, tampering with the system clock signal, or altering environmental conditions to cause a malfunction in the target computing device. Many FIAs can be performed in a relatively short amount of time using inexpensive equipment. By taking advantage of an induced malfunction, an attacker may be able to gain unauthorized access to a device.

In general, this disclosure describes computing devices that include security logic configured to increase resistance to FIAs. The security logic is designed to act as a surrogate of a computing device critical path length. The security logic includes a monitoring circuit and a cascaded series of substitution boxes (S-Boxes) having an S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the number of clock cycles required for the cascaded series of S-Boxes to return to the initial value and generates an error signal if the monitored loop length is different from the expected loop length. In some examples, the error signal is received by a mitigation processor that executes one or more processes aimed at mitigating the attack.

In some examples, selection of the S-Box parameters may be optimized to provide "balanced" logical paths within each S-Box. By selecting parameter values to result in S-Boxes having balanced logical paths, the likelihood that at least one of the logical paths in the S-Box cascade will experience an error during a fault injection attack is increased. Increasing the likelihood that at least one S-Box logical path will experience an error during a fault injection attack further increases the likelihood that the attack will be detected and reported so that attack mitigation processes may be invoked.

In one example, the disclosure is directed to a system on a chip (SoC) comprising security logic implemented in circuitry comprising: a substitution-box (S-Box) cascade including one or more S-Boxes connected in series, wherein a number of S-Boxes in the S-Box cascade is selected such that an S-Box cascade loop length matches an SoC critical path length; and a monitor circuit including: a random number generator that generates an initial random value for input to a first one of the one or more S-Boxes in the S-Box cascade for an initial loop of the S-Box cascade; a loop count register that stores one or more predetermined loop counts for the S-Box cascade; a loop counter circuit that receives an output value generated by a last one of the one or more S-Boxes in the S-Box cascade upon completion of each loop of the S-Box cascade, increments a loop counter upon receipt of each output value, and compares the received output value to the initial random value generated by the random number generator; and a comparator that, in response to a determination by the loop counter circuit that the received output value is equal to the initial random value, compares a current value of the loop counter to each of the predetermined loop counts and generates an error signal when the current value of the loop counter does not equal any of the predetermined loop counts.

In another example, the disclosure is directed to a head-mounted device (HMD) comprising a system on a chip (SoC) comprising: security logic comprising: a substitution-box (S-Box) cascade including one or more S-Boxes connected in series, wherein an output of a last one of the one or more S-Boxes in the S-Box cascade is connected to a first input of a first one of the one or more S-Boxes in the S-Box cascade, and further wherein a number of S-Boxes in the S-Box cascade is selected such that an S-Box cascade loop length matches an SoC critical path length; and a monitor circuit including: a random number generator that generates an initial random value for input to the first one of the one or more S-Boxes in the S-Box cascade for an initial loop of the S-Box cascade; a loop count register that stores one or more predetermined loop counts for the S-Box cascade; a loop counter circuit that receives an output value generated by the last one of the one or more S-Boxes in the S-Box cascade upon completion of each loop of the S-Box cascade, increments a loop counter upon receipt of each output value, and compares the received output value to the initial random value generated by the random number generator; and a comparator that, in response to a determination by the loop counter circuit that the received output value is equal to the initial random value, compares a current value of the loop counter to each of the predetermined loop counts and generates an error signal when the current value of the loop counter does not equal any of the predetermined loop counts.

In another example, the disclosure is directed to a peripheral device comprising a system on a chip (SoC) comprising:

security logic comprising: a substitution-box (S-Box) cascade including one or more S-Boxes connected in series, wherein an output of a last one of the one or more S-Boxes in the S-Box cascade is connected to a first input of a first one of the one or more S-Boxes in the S-Box cascade, and further wherein a number of S-Boxes in the S-Box cascade is selected such that an S-Box cascade loop length matches an SoC critical path length; and a monitor circuit including a random number generator that generates an initial random value for input to the first one of the one or more S-Boxes in the S-Box cascade for an initial loop of the S-Box cascade; a loop count register that stores one or more predetermined loop counts for the S-Box cascade; a loop counter circuit that receives an output value generated by the last one of the one or more S-Boxes in the S-Box cascade upon completion of each loop of the S-Box cascade, increments a loop counter upon receipt of each output value, and compares the received output value to the initial random value generated by the random number generator; and a comparator that, in response to a determination by the loop counter circuit that the received output value is equal to the initial random value, compares a current value of the loop counter to each of the predetermined loop counts and generates an error signal when the current value of the loop counter does not equal any of the predetermined loop counts.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1B is an illustration depicting another example artificial reality system, components of which include security logic for detection of a fault injection attack, in accordance with one or more aspects of this disclosure.

FIGS. 7A-7C illustrate an example look up table (LUT) implementation of an advanced encryption standard (AES)-specified byte substitution (S-Box) and an inverse byte substitution (inverse S-Box).

DETAILED DESCRIPTION

Figure 1A:
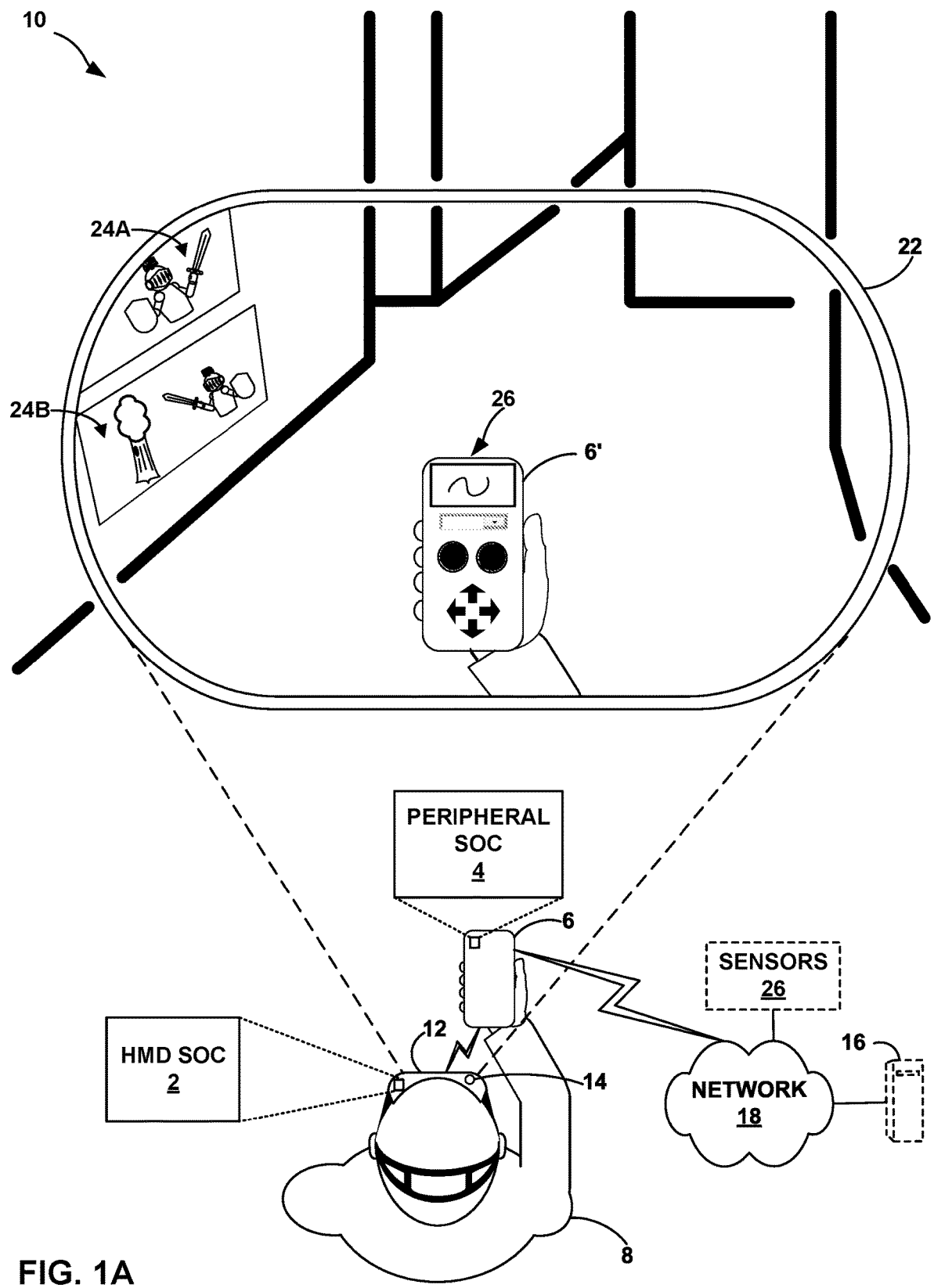
FIG. 1A is an illustration depicting an example multi-device artificial reality system, components of which include security logic for detection of a fault injection attack, in accordance with one or more aspects of this disclosure.

Artificial reality systems are becoming increasingly ubiquitous with applications in many fields such as computer gaming, health and safety, industrial fields, and education. As a few examples, artificial reality systems are being incorporated into mobile devices, gaming consoles, personal computers, movie theaters, and theme parks. In general, artificial reality is a form of reality that has been adjusted in some manner before presentation to a user and may include one or more of virtual reality (VR), augmented reality (AR), mixed reality (MR), hybrid reality, or some combination and/or derivative thereof.

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device, such as a smart phone or other mobile computing device, that operates as a co-processing device when paired with the HMD. The artificial reality content may include completely generated content or generated content combined with captured content (e.g., real-world video and/or real-world images). The peripheral device and the HMD may each include one or more system on a chip (SoC) integrated circuits (referred to herein simply as "SoCs") that are collectively configured to provide an artificial reality application execution environment. The SoCs may include one more security measures or features aimed at providing authentication and/or preventing unauthorized access to the system hardware and/or software.

Certain types of computing devices, including the components of artificial reality systems, can be vulnerable to attack mechanisms that rely on gleaning information about or disabling one or more security functions. An example of such an attack mechanism is a so-called "fault injection attack" or FIA. The objective of an FIA is to alter the correct functioning of a computing device, thereby leading to the reduction or disabling of security features or countermeasures. Types of FIAs include voltage glitching, tampering with the system clock signal, or altering environmental conditions to cause a malfunction in the target computing device. Many FIAs can be performed in a relatively short amount of time using inexpensive equipment. By taking advantage of an induced malfunction, an attacker may be able to gain unauthorized access to a device.

In general, this disclosure describes computing devices that include security logic configured to increase resistance to FIAs. The security logic is designed to act as a surrogate of a computing device critical path length. The security logic includes a monitoring circuit and a cascaded series of substitution boxes (S-Boxes) having an S-Box cascade circuit delay that is designed to match the computing device critical path length. The S-Box cascade has an expected "loop length" or integer number of clock cycles in which the output of the S-Box cascade returns to an initial value. The monitoring circuit monitors the loop length of the cascaded series of S-Boxes during execution and generates an error signal if the monitored loop length is different from the expected loop length. In some examples, the error signal is received by a mitigation processor that executes one or more processes aimed at mitigating the attack.

FIG. 1A is an illustration depicting an example multi-device artificial reality system 10. Components of multi-device artificial reality system 10, such as a head-mounted device 12 worn by a user and/or a peripheral device 6 that functions as a co-processing device with the head-mounted device 12, include one or more SoCs (e.g., SoC 2 and SoC 4), each of which may include security logic configured to increase resistance to FIAs, in accordance with one or more aspects of this disclosure. The security logic includes a monitoring circuit and a cascaded series of substitution boxes (S-Boxes) having an S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the loop length required for the cascaded series of S-Boxes to return to the initial value and generates an error signal if the monitored loop length is different from the expected loop length. In some examples, the error signal is received by a mitigation processor that executes one or more processes aimed at mitigating the attack.

Multi-device artificial reality system 10 includes a head-mounted device (HMD) 12 and a peripheral device 6. HMD 12 is typically worn by a user 8. HMD 12 typically includes an electronic display and optical assembly for presenting artificial reality content 22 to user 8. In addition, HMD 12 includes one or more sensors (e.g., accelerometers) for tracking motion of HMD 12. HMD 12 may include one or more image capture devices 14, e.g., cameras, line scanners, fundal photography hardware, or the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 8 for user authentication and for other purposes.

HMD 12 is shown in this example as being in communication with (e.g., in wireless communication with or tethered to) peripheral device 6. Peripheral device 6 represents a co-processing device in communication with HMD 12. HMD 12 and/or peripheral device 6 may execute an artificial reality application to construct artificial reality content 22 for display to user 8. For example, HMD 12 and/or peripheral device 6 may construct the artificial reality content based on tracking pose information and computing pose information for a frame of reference, typically a viewing perspective of HMD 12.

As shown in FIG. 1A, one or more devices of multi-device artificial reality system 10 may be connected to a computing network, such as network 18. Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 18 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 10 or coupled to multi-device artificial reality system 10 via network 18. The optional nature of these devices is shown in FIG. 1A by way of dashed-line borders. One example of an optional device shown in FIG. 1A is console 16. In implementations that include console 16, console 16 may communicate directly with HMD 12, and/or with peripheral device 6 (and thereby, indirectly with HMD 12) to process artificial reality content that HMD 12 outputs to user 8. Another example of optional hardware shown in FIG. 1A is represented by external sensors 26. Multi-device artificial reality system 10 may use external sensors 26 and/or external camera hardware to capture three-dimensional (3D) information within the real-world, physical environment at which user 8 is positioned.

In general, multi-device artificial reality system 10 uses information captured from a real-world, 3D physical environment to render artificial reality content 22 for display to user 8. In the example of FIG. 1A, user 8 views the artificial reality content 22 constructed and rendered by an artificial reality application executing on the combination of HMD 12 peripheral device 6. In some examples, artificial reality content 22 may comprise a combination of real-world imagery (e.g., peripheral device 6 in the form of peripheral device representation 6', representations of walls at the physical environment at which user 8 is presently positioned, a representation of the hand with which user 8 holds peripheral device 6, etc.) overlaid with virtual objects (e.g., virtual content items 24A and 24B, virtual user interface 26, etc.) to produce an augmented reality experience or a mixed reality experience displayed to user 8 via display hardware of HMD 12.

In some examples, virtual content items 24A and 24B (collectively, virtual content items 24) may be mapped to a particular position within artificial reality content 22. As examples, virtual content items 24 may be pinned, locked, or placed to/at certain position(s) within artificial reality content 22. A position for a virtual content item may be fixed, as relative to one of the walls of the real-world imagery reproduced in artificial reality content 22, or to the earth, as examples. A position for a virtual content item may be variable, as relative to peripheral device representation 6' or to the tracked gaze or field of view (FoV) of user 8, as non-limiting examples. In some examples, the particular position of a virtual content item within artificial reality content 22 is associated with a position within the real-world, physical environment (e.g., on a surface of a physical object) at which user 8 is positioned presently.

In this example, peripheral device 6 is a physical, real-world device having a surface on which the artificial reality application executing on computing platforms of multi-device artificial reality system 10 overlays virtual user interface 26. Peripheral device 6 may include one or more presence-sensitive surfaces for detecting user inputs by detecting a presence of one or more objects (e.g., fingers, stylus) touching or hovering over locations of the presence-sensitive surface. In some examples, peripheral device 6 may include one or more output devices, such as a display integrated into the presence-sensitive surface to form an input/output (I/O) component of peripheral device 6.

In some examples, peripheral device 6 may have the form factor of various portable devices, such as a smartphone, a tablet computer, personal digital assistant (PDA), or other handheld device. In other examples, peripheral device 6 may have the form factor of various wearable devices, such as a so-called "smartwatch," "smart ring," or other wearable device. In some examples, peripheral device 6 may be part of a kiosk or other stationary or mobile system. While described above as integrating display hardware, peripheral device 6 need not include display hardware in all implementations.

In the example artificial reality experience shown in FIG. 1A, virtual content items 24 are mapped to positions on a visual representation of a wall of the real-world physical environment at which user 8 is positioned. The example in FIG. 1A also shows that virtual content items 24 partially appear on the visual representation of the wall only within artificial reality content 22, illustrating that virtual content items 24 do not represent any items that exist in the real-world, physical environment at which user 8 is positioned. Virtual user interface 26 is mapped to a surface of peripheral device 6 as represented in peripheral device representation 6'. Multi-device artificial reality system 10 renders virtual user interface 26 for display via HMD 12 as part of artificial reality content 22, at a user interface position that is locked relative to the position of a particular surface of peripheral device 6.

FIG. 1A shows that virtual user interface 26 appears overlaid on peripheral device representation 6' (and therefore, only within artificial reality content 22), illustrating that the virtual content represented in virtual user interface 26 does not exist in the real-world, physical environment at which user 8 is positioned. Multi-device artificial reality system 10 may render one or more virtual content items in response to a determination that at least a portion of the location of virtual content items is in the FoV of user 8. For example, multi-device artificial reality system 10 may render virtual user interface 26 on peripheral device 6 only if peripheral device 6 is within the FoV of user 8.

Various devices of multi-device artificial reality system 10 may operate in conjunction in the artificial reality environment, such that each device may be a separate physical electronic device and/or separate integrated circuits within one or more physical devices. In this example, peripheral device 6 is operationally paired with HMD 12 to jointly operate to provide an artificial reality experience. For example, peripheral device 6 and HMD 12 may communicate with each other as co-processing devices. As one example, when a user performs a user interface-triggering gesture in the virtual environment at a location that corresponds to one of the virtual user interface elements of virtual user interface 26 overlaid on peripheral device representation 6', multi-device artificial reality system 10 detects the user interface and performs an action that is rendered and displayed via HMD 12.

Each of peripheral device 6 and HMD 12 may include one or more SoC integrated circuits configured to support aspects of the artificial reality application described above, such as SoCs operating as co-application processors, encryption engines, decryption engines, sensor aggregators, display controllers, etc. Although each of peripheral device 6 and HMD 12 may include multiple SoCs, FIG. 1A only illustrates HMD SoC 2 of HMD 12 and peripheral SoC 4 of peripheral device 6, for ease of illustration and discussion. To preserve security and digital rights, HMD SoC 2 and peripheral SoC 4 are configured to communicate with one another using encrypted data streams, such as by sending crypto packet flows over a wireless link formed using respective peripheral component interface (PCI) express (PCIe) buses of HMD SoC 2 of HMD 12 and peripheral SoC 4.

As one example, HMD SoC 2 may encrypt facial images, retina scans, iris scans, etc. of user 8 (e.g., as captured by inward-facing camera hardware and/or fundal photography hardware of image capture devices 14) and send the encrypted data to peripheral SoC 4 for authentication purposes and optionally, for other purposes as well. In this example, peripheral SoC 4 may decrypt the encrypted data received from HMD SoC 2, and process the decrypted data using facial recognition technology, retinal blood vessel pattern recognition technology, etc. to grant/deny biometric authentication to user 8. These encryption and decryption operations comply with the standardized encryption and decryption mechanisms described in the advanced encryption standard (AES) established by the United States National Institute of Standards and Technology (NIST) as a non-limiting example. It will be appreciated that HMD SoC 2 and peripheral SoC 4 may, in other examples, include encryption/decryption engines that comply with other cipher standards, such as SM4 (formerly SMS4, a block cipher standard set forth in the Chinese National Standard for Wireless LAN WAPI), Camellia (developed by Mitsubishi Electric and NTT Corporation of Japan), etc.

While the embedded security techniques of this disclosure are described with respect to being implemented within multi-device artificial reality system 10 as an example, it will be appreciated that the applicability of the techniques of this disclosure are not limited to artificial reality systems. The embedded security techniques of this disclosure can also be implemented to improve security in other types of computing devices, including, but not limited to, various types of battery-powered SoC-driven and/or application specific integrated circuit (ASIC)-driven technologies.

FIG. 1B is an illustration depicting another example multi-device artificial reality system 20. Similar to multi-device artificial reality system 10 of FIG. 1A, one or more components of multi-device artificial reality system 10, such as a head-mounted device 12 worn by a user and/or a peripheral device 6 that functions as a co-processing device with the head-mounted device 12, include one or more SoCs (e.g., SoC 2 and SoC 4) each of which may include security logic configured to increase resistance to FIAs, in accordance with one or more aspects of this disclosure. The security logic is designed to act as a surrogate of the SoC critical path length. The security logic includes a monitoring circuit and a cascaded series of substitution boxes (S-Boxes) having a S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the number of loops required for the cascaded series of S-Boxes to return to the initial value and generates an error signal if the monitored loop length is different from the expected loop length. In some examples, the error signal is received by a mitigation processor that executes one or more processes aimed at mitigating the attack.

In the example of FIG. 1B, multi-device artificial reality system 20 includes external cameras 28A and 28B (collectively, "external cameras 28"), HMDs 12A-12C (collectively, "HMDs 12"), console 16, and sensors 26. As shown in FIG. 1B, multi-device artificial reality system 20 represents a multi-user environment in which an artificial reality application executing on console 16 and/or HMDs 12 presents artificial reality content to each of users 8A-8C (collectively, "users 8") based on a current viewing perspective of a corresponding frame of reference for the respective user 8. That is, in this example, the artificial reality application constructs artificial reality content by tracking and computing pose information for a frame of reference for each of HMDs 12. Multi-device artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within multi-device artificial reality system 20. In the example of FIG. 1B, any of users 8 may be a "player" or "participant" in the artificial reality application, and any of users 8 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A and may receive user inputs by tracking movements of the hands of user 8A.

Each of HMDs 12 implements a respective user-facing artificial reality platform (or co-implements the platform with a co-processing device, as in the case of HMD 12A with peripheral device 6), and outputs respective artificial content, although only artificial reality content 22 output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor. In some use case scenarios, HMDs 12B and/or 12C may also be paired (e.g., wirelessly coupled or tethered to) a portable device that implements generally corresponding features to those described with respect to peripheral device 6.

Figure 2A:
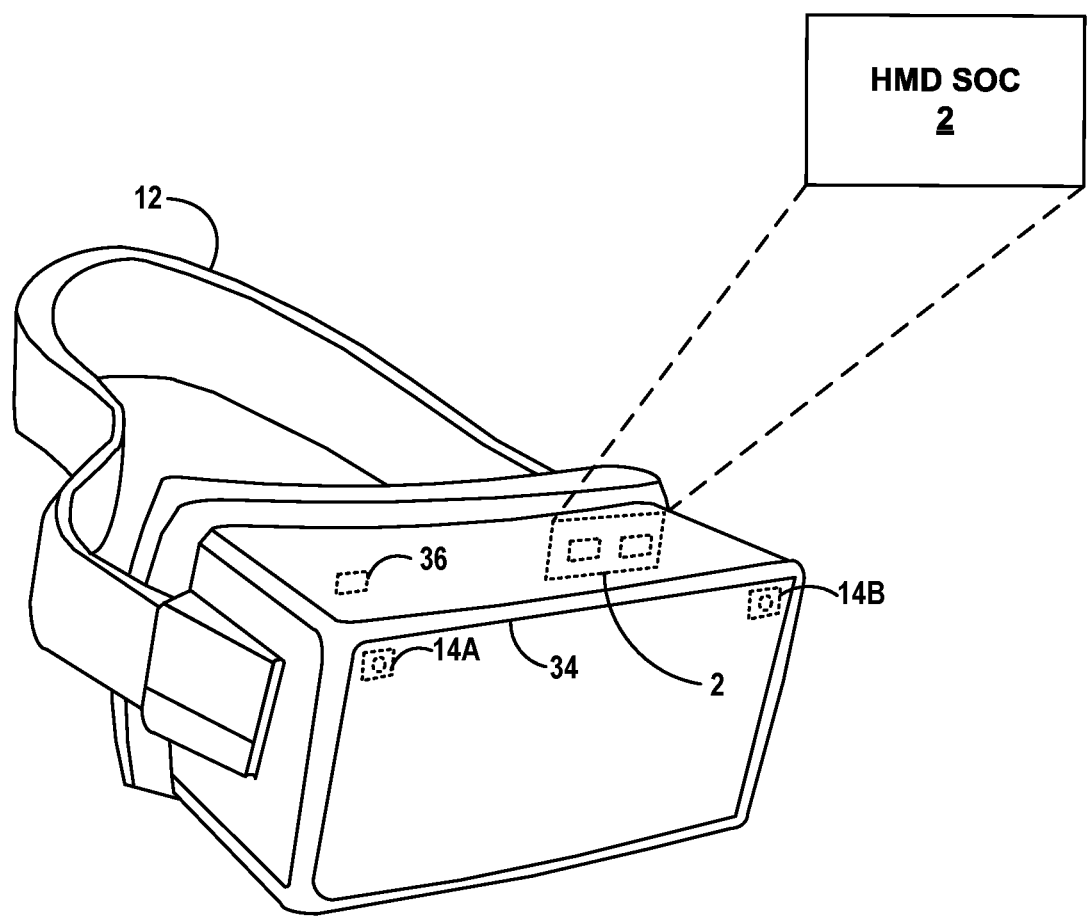
FIG. 2A is an illustration depicting an example HMD including security logic for detection of a fault injection attack, in accordance with one or more aspects of this disclosure.

FIG. 2A is an illustration depicting an example HMD 12 including one or more SoCs 2 each of which may include security logic configured to increase resistance to FIAs, in accordance with one or more aspects of this disclosure. The security logic is designed to act as a surrogate of the SoC critical path length. The security logic includes a monitoring circuit and a cascaded series of substitution boxes (S-Boxes) having a S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the number of loops required for the cascaded series of S-Boxes to return to the initial value and generates an error signal if the monitored loop length is different from the expected loop length. In some examples, the error signal is received by a mitigation processor that executes one or more processes aimed at mitigating the attack.

HMD 12 of FIG. 2A may be an example of any of HMDs 12 of FIGS. 1A and 1B. In some examples, HMD 12 may be part of an artificial reality system that incorporates other devices and network intermediaries, such as in the examples of multi-device artificial reality systems 10 and 20 illustrated in FIGS. 1A and 1B. In other examples, HMD 12 may operate as a standalone, mobile artificial realty system configured to implement the SCA-thwarting techniques described herein. In the example of FIG. 2A, HMD 12 takes the general form factor of a headset or goggles.

In this example, HMD 12 includes a front rigid body and a band to secure HMD 12 to the wearer (e.g., user 8). In addition, HMD 12 includes an interior-facing electronic display 34 configured to present artificial reality content to user 8. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and user 8.

Figure 2B:
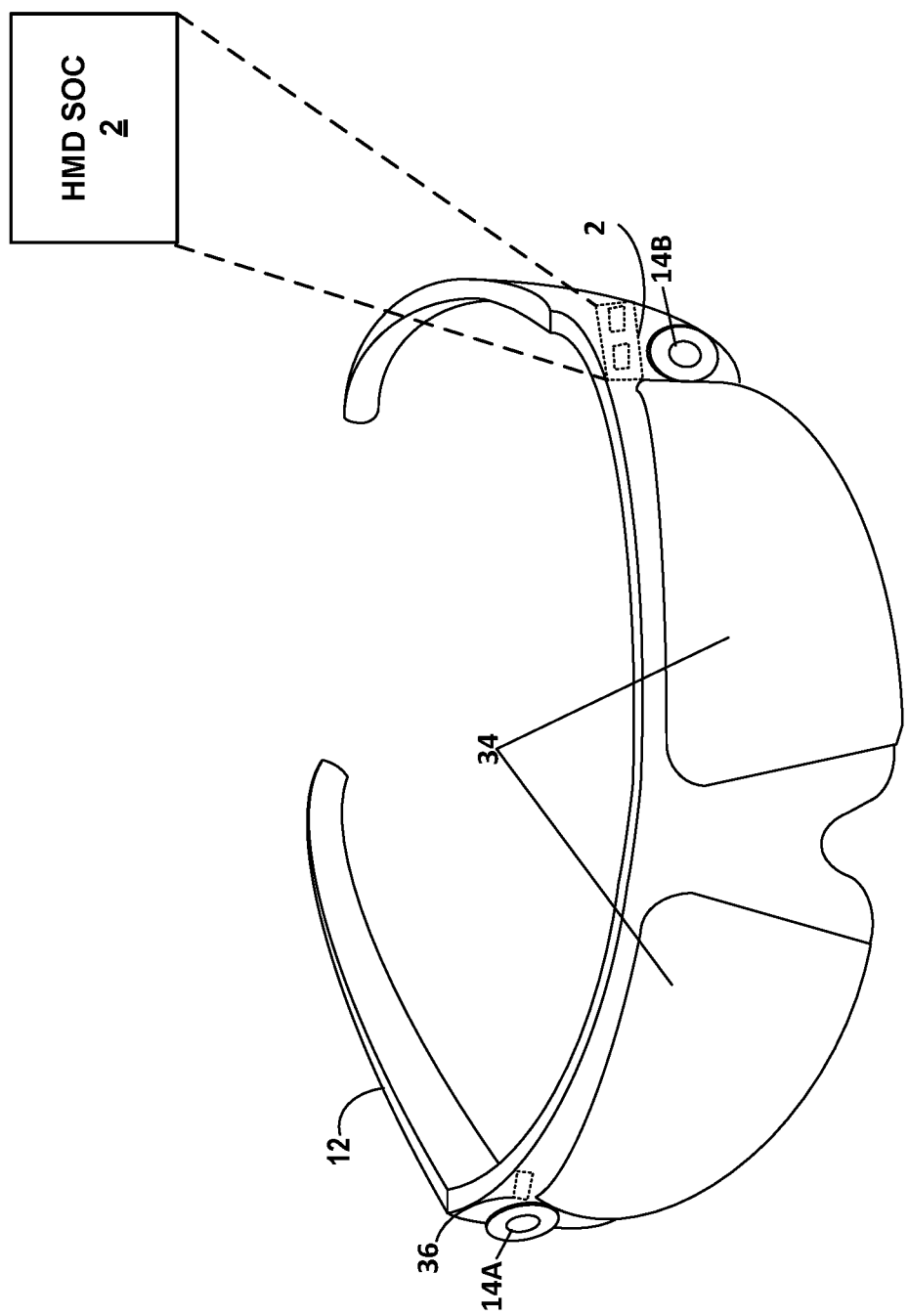
FIG. 2B is an illustration depicting another example of an HMD including security logic for detection of a fault injection attack, in accordance with one or more aspects of this disclosure.

FIG. 2B is an illustration depicting another example of HMD 12 including one or more SoCs 2, each of which may include security logic configured to increase resistance to FIAs in accordance with one or more aspects of this disclosure. The security logic is designed to act as a surrogate of the SoC critical path length. The security logic includes a monitoring circuit and a cascaded series of substitution boxes (S-Boxes) having a S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the number of loops required for the cascaded series of S-Boxes to return to the initial value and generates an error signal if the monitored loop length is different from the expected loop length. In some examples, the error signal is received by a mitigation processor that executes one or more processes aimed at mitigating the attack.

HMD 12 of FIG. 2B may be an example of any of HMDs 12 of FIGS. 1A and 1B. HMD 12 may be part of an artificial reality system, such as artificial reality systems 10, 20 of FIGS. 1A, 1B, or may operate as a stand-alone, mobile artificial realty system configured to implement the techniques described herein. In the example of FIG. 2B, HMD 12 takes the general form factor of glasses.

In this example, HMD 12 includes a front rigid body and two stems to secure HMD 12 to a user, e.g., by resting over the wearer's ears. Elements of FIG. 2B that share reference numerals with elements of FIG. 2A perform corresponding functionalities and are not described separately with respect to FIG. 2B for the sake of brevity. In the example of FIG. 2B, electronic display 34 may be split into multiple segments, such as into two segments, with each segment corresponding to a separate lens disposed on the rigid front body of HMD 12. In other examples in accordance with FIG. 2B, electronic display 34 may form a contiguous surface that spans both lenses and the lens-connecting bridge (i.e., the over-the-nose portion) of the rigid front body of HMD 12. In some examples in accordance with the form factor illustrated in FIG. 2B, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2B improve accessibility for users having different visual capabilities (e.g., with respect to peripheral vision and/or central vision, nearfield vision and/or distance vision, etc.), eye movement idiosyncrasies, etc.

In the examples illustrated in each of FIGS. 2A & 2B, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment.

In the examples illustrated in each of FIGS. 2A & 2B, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data.

Outward-facing camera hardware of image capture devices 14 may capture image data of the physical environment outside of HMD 12, such as, but not limited to, the real-world environment at which user 8 is positioned. Inward-facing camera hardware of image capture devices 14 may capture image data of the wearer of HMD 12, such as facial images and/or retina scans. Other inward-facing sensor hardware of HMD 12 may capture other types of information pertaining to the wearer, such as temperature information or other types of information or metrics.

Figure 2C:
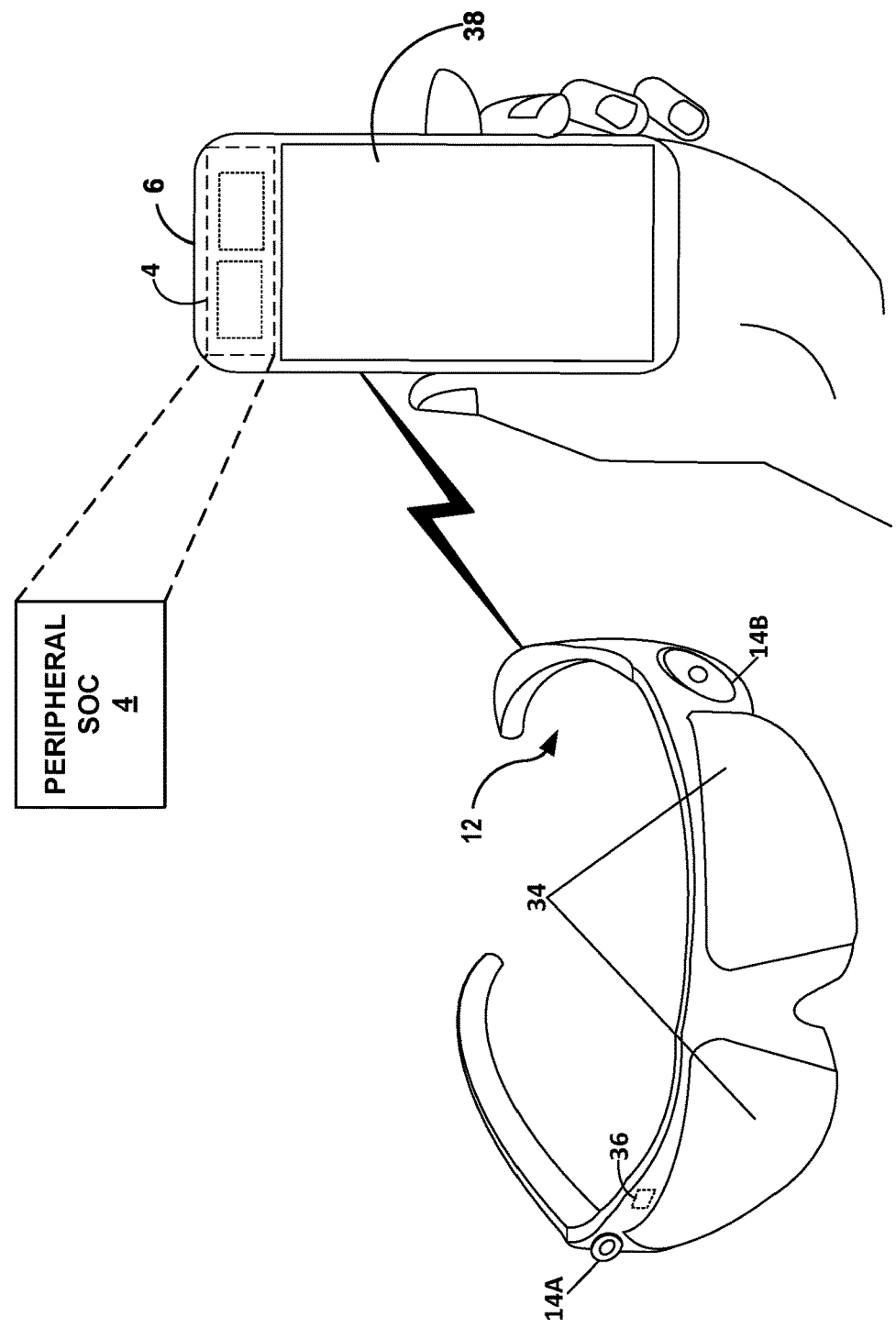
FIG. 2C is an illustration depicting an example of a peripheral device including security logic for detection of a fault injection attack, in accordance with one or more aspects of this disclosure.

FIG. 2C is an illustration depicting an example of a peripheral device 6 including one or more SoCs 4, each of which may include security logic configured to increase resistance to FIAs in accordance with one or more aspects of this disclosure. The security logic is designed to act as a surrogate of the SoC critical path length. The security logic includes a monitoring circuit and a cascaded series of substitution boxes (S-Boxes) having a S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the number of loops required for the cascaded series of S-Boxes to return to the initial value and generates an error signal if the monitored loop length is different from the expected loop length. In some examples, the error signal is received by a mitigation processor that executes one or more processes aimed at mitigating the attack.

HMD 12 of FIG. 2C may be an example of any of HMDs 12 of FIGS. 1A and 1B, and takes the form factor of glasses, as in the case of HMD 12C of FIG. 1B and HMD 12 of FIG. 2B. In the example of FIG. 2C, image capture devices 14 may capture image data representative of various objects, including peripheral device 6 and/or of the hand(s) of user 8 in the physical environment that are within the FoV of image capture devices 14, which may generally correspond to the viewing perspective of HMD 12. As described above, peripheral SoC 4 and HMD SoC 2 are generally configured to communicate using encryption/decryption of secure data.

In some examples, peripheral device 6 may receive encrypted data from HMD 12 (e.g., encrypted facial images and/or retina scans of user 8, other authentication information, etc.), and may decrypt the received encrypted data for user authentication purposes. Peripheral device 6 may encrypt data for various purposes, such as for encryption prior to transmission over network 18, prior to transmission to HMD 12, or for other purposes, as described above with respect to FIGS. 1A-2B.

Surface 38 of peripheral device 6 represents an input component or a combined input/output component of peripheral device 6. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 6 to receive touch input or gesture input without direct contact with surface 38. User 8 may provide these touch or gesture inputs to peripheral device 6 to provide instructions directly to peripheral device 6, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 6, of the hand(s) or digit(s) thereof of user 8 to enable to provide input using gestures such as drawing gestures or typing gestures provided via a graphical keyboard.

Peripheral device 6 can communicate data to and receive data from HMD 12 (e.g., egress and ingress crypto packet flows) using wireless communications links (e.g., Wi-Fi', near-field communication of short-range wireless communication such as Bluetooth®, etc.), or using wired communication links, or combinations thereof, or using other types of communication links. In the example of FIG. 2C, peripheral device 6 is also communicatively coupled to network 18, thereby enabling peripheral device 6 to uploaded encrypted data to securely communicate data to remote devices over network 18.

In this way, peripheral device 6 may offload various hardware and resource burdens from HMD 12, which enables low-profile form factor designs of HMD 12. Peripheral device 6 also serves as a communications intermediary between HMD 12 and devices at remote locations, via network 18. Further details of peripheral device 6 are described in U.S. patent application Ser. No. 16/506,618, filed on 9 Jul. 2019, the entire content of which is incorporated herein by reference.

Figure 3:
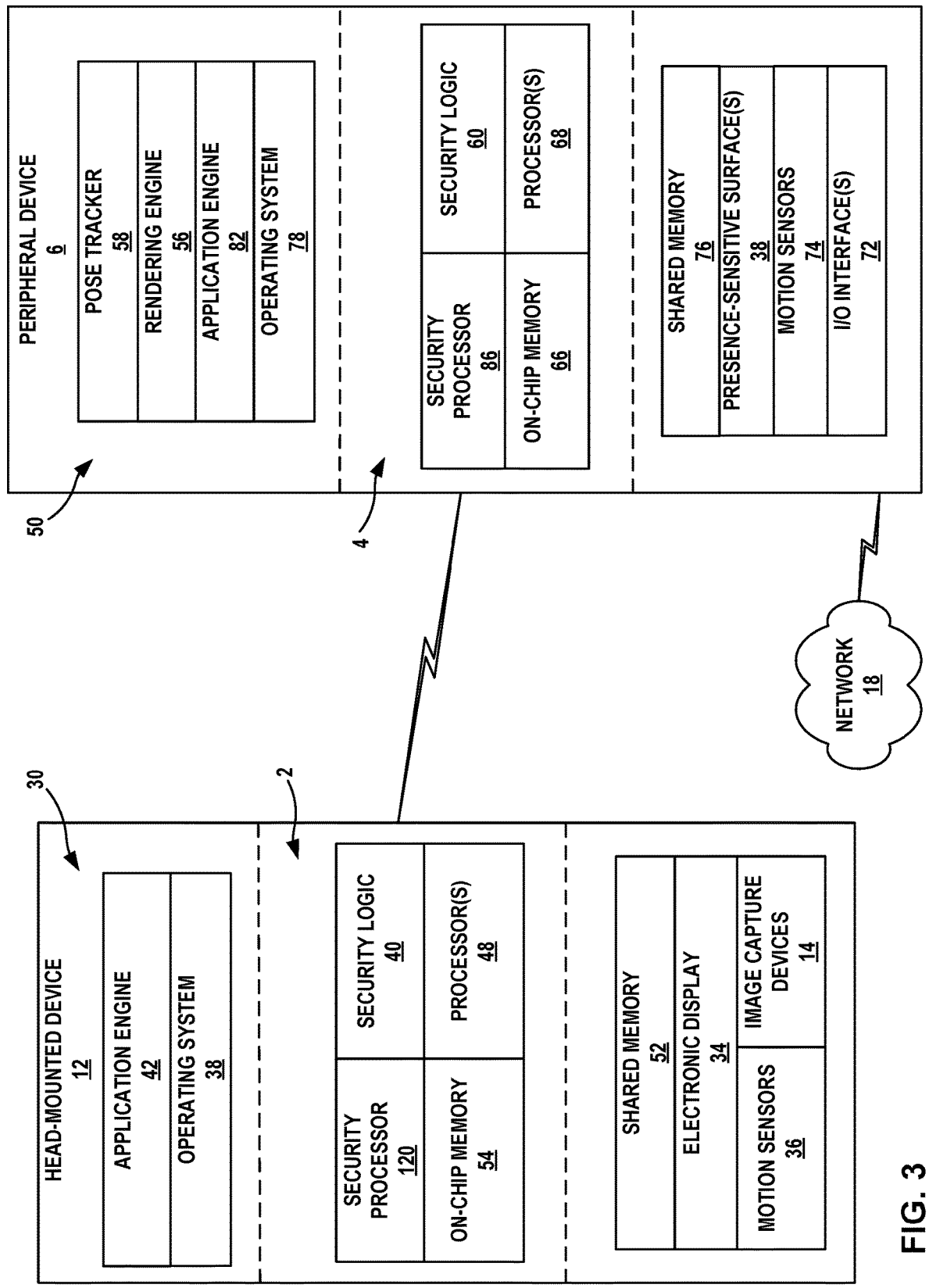
FIG. 3 is a block diagram showing example implementations of an HMD and a peripheral device, each of which includes security logic for detection of a fault injection attack, in accordance with one or more aspects of this disclosure.

FIG. 3 is a block diagram showing example implementations of HMD 12 and peripheral device 6. In this example, HMD SoC 2 of HMD 12 includes one or more processors 48, a memory 52, a security processor 120 and security logic 40.

Shared memory 52 and processor(s) 48 of HMD 12 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 48 may be coupled to one or more of electronic display 34, motion sensors 36, and/or image capture devices 14. Processor(s) 48 are included in HMD SoC 2, which also includes on-chip memory 56. On-chip memory 54 is collocated with processor(s) 48 within a single integrated circuit denoted as HMD SoC 2 in the particular example shown in FIG. 3. Processor(s) 48 may use on-chip memory 54 as a temporary storage location for self-contained data processing performed within HMD SoC 2. Processor(s) 48 and on-chip memory 54 may combine to implement scheduler 3, although scheduler 3 is illustrated as a standalone component of HMD SoC 2 purely for the purposes of ease of illustration and discussion.

HMD 12 is communicatively coupled to peripheral device 6, as shown in FIG. 3. Peripheral device 6 and HMD 12 function in tandem as co-processing devices to deliver the artificial reality experiences to user 8 as described above with respect to FIGS. 1A-2. Peripheral device 6 may offload portions of the computing tasks otherwise performed by HMD 12, thereby enabling a reduced hardware infrastructure and therefore a lower-profile form factor with respect to the design of HMD 12.

Peripheral device 6 includes presence-sensitive surface 38 (described above with respect to FIG. 2), as well as input/output (I/O) interface(s) 72, and motion sensors 74. Peripheral device 6 may invoke I/O interface(s) 72 to send and receive data over network 18, such as cipher text or plain text (unencrypted) data. I/O interface(s) 72 may also incorporate hardware that enables peripheral device 6 to communicate wirelessly with HMD 12. Peripheral device 6 may invoke motion sensors 74 to detect and track motion by user 8 for use in computing updated pose information for a corresponding frame of reference of HMD 12.

Peripheral SoC 4 of peripheral device 6 includes one or more processors 68, on-chip memory 66, a security processor 86 and security logic 60. On-chip memory 66 represents memory collocated with processor(s) 68 within a single integrated circuit denoted as peripheral SoC 4 in the particular example shown in FIG. 3. Processor(s) 68 may use on-chip memory 66 as a temporary storage location for self-contained data processing performed within peripheral SoC 4.

Shared memory 76 and processor(s) 68 of peripheral device 6 provide a computer platform for executing an operating system 78. Operating system 78 may represent an embedded, real-time multitasking operating system, for instance, or other type of operating system. In turn, operating system 78 provides a multitasking operating environment for executing one or more software components 50. Apart from operating system 78, software components 50 include an application engine 82, a rendering engine 56, and a pose tracker 58. In some examples, software components 50 may not include rendering engine 56, and HMD 12 may perform the rendering functionalities without co-processing with peripheral device 6.

In general, application engine 82, when invoked, provides functionality to provide and present an artificial reality application, e.g., a teleconference application, a gaming application, a navigation application, an educational application, a training application, a simulation application, or the like, to user 8 via HMD 12. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 22 (e.g., incorporating 3D artificial reality content) for display to user 8 by application engine 42 of HMD 12.

Application engine 82 and rendering engine 56 construct artificial reality content 22 for display to user 8 in accordance with current pose information for a frame of reference, typically a viewing perspective of HMD 12, as determined by pose tracker 58. Based on the current viewing perspective as determined by pose tracker 58, rendering engine 56 constructs artificial reality content 22 (e.g., 3D artificial content) which may in some cases be overlaid, at least in part, upon the real-world 3D environment of user 8. During this process, pose tracker 58 operates on sensed data received from HMD 12, such as movement information and user commands, and, in some examples, data from any external sensors 26 (shown in FIGS. 1A & 1B), to capture 3D information within the real-world environment, such as motion by user 8 and/or feature tracking information with respect to user 8. Based on the sensed data, pose tracker 58 determines a current pose for the frame of reference of HMD 12 and, in accordance with the current pose, constructs artificial reality content 22 for communication, via one or more I/O interfaces 72, to HMD 12 for display to user 8.

Each of processors 48 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 76, on-chip memory 54, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

Security logic 40 of HMD 12 and security logic 60 of peripheral device 6 are configured to increase resistance to FIAs, in accordance with one or more aspects of this disclosure. Security logic 40 and security logic 60 are designed to act as a surrogate of the critical path length of SoC 2 and SoC 4, respectively. Each of security logic 40, 60 includes a monitoring circuit and a cascaded series of substitution boxes (S-Boxes) having a S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the number of loops required for the cascaded series of S-Boxes to return to the initial value and generates an error signal if the monitored loop length is different from the expected loop length. In some examples, the error signal is received by a mitigation processor that executes one or more processes aimed at mitigating the attack.

Figure 4:
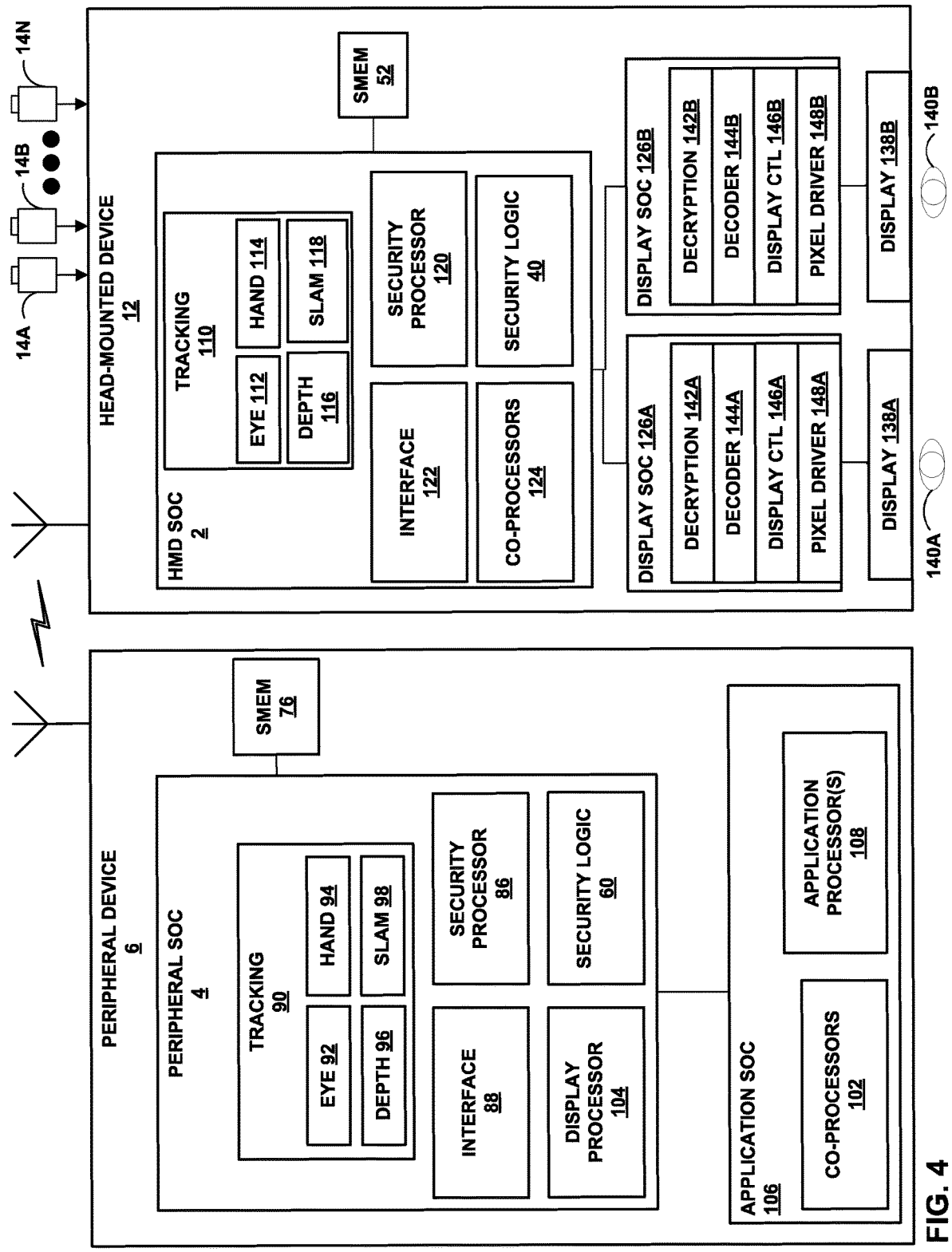
FIG. 4 is a block diagram illustrating a more detailed example implementation of a distributed architecture for multi-device artificial reality systems in which two or more devices are implemented using one or more system on a chip (SoC) integrated circuits within each device, and which include security logic for detection of a fault injection attack, in accordance with one or more aspects of this disclosure.

FIG. 4 is a block diagram illustrating a more detailed example implementation of a distributed architecture for a portion of multi-device artificial reality systems 10 and 20, in which two or more devices are implemented using respective SoC integrated circuits within each device. FIG. 4 illustrates an example in which HMD 12 operating in conjunction with peripheral device 6. Again, peripheral device 6 represents a physical, real-world device having a surface on which multi-device artificial reality systems 10 or 20 overlay virtual content. Peripheral device 6 includes one or more presence-sensitive surface(s) 38 for detecting user inputs by detecting a presence of one or more objects (e.g., fingers, stylus, etc.) touching or hovering over locations of presence-sensitive surfaces) 38.

In some examples, peripheral device 6 may have a form factor similar to any of a smartphone, a tablet computer, a personal digital assistant (PDA), or other hand-held device. In other examples, peripheral device 6 may have the form factor of a smartwatch, a so-called "smart ring," or other wearable device. Peripheral device 6 may also be part of a kiosk or other stationary or mobile system. Presence-sensitive surface(s) 38 may incorporate output components, such as display device(s) for outputting visual content to a screen. As described above, HMD 12 is architected and configured to enable the execution of artificial reality applications.

Each of HMD SoC 2, peripheral SoC 4, and the other SoCs illustrated in FIG. 4 represent specialized integrated circuits arranged in a distributed architecture, where each SoC integrated circuit includes various specialized functional blocks configured to provide an operating environment for artificial reality applications. FIG. 4 is merely one example arrangement of SoC integrated circuits that peripheral device 6 and HMD 12. The distributed architecture for multi-device artificial reality systems 10 and 20 may include any collection and/or arrangement of SoC integrated circuits.

In the example of FIG. 4, HMD SoC 2 of HMD 12 comprises functional blocks including tracking 110, security processor 120, interface 122, co-processors 124, and security logic 40. Tracking 110 provides a functional block for eye tracking 112 ("eye 112"), hand tracking 114 ("hand 114"), depth tracking 116 ("depth 116"), and Simultaneous Localization and Mapping (SLAM) 118 ("SLAM 118").

For example, HMD 12 may receive input from one or more accelerometers (e.g., quantities represented in inertial measurement units or "IMUs") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 6 and/or hand and/or the eyes of user 8) in the physical environment that are within a field of view of image capture devices, which typically corresponds with the viewing perspective of HMD 12 or the inward-facing view of HMD 12. Based on a portion of the sensed data and/or a portion of the image data, tracking 110 determines, for example, a current pose for the frame of reference of HMD 12 and, in accordance with the current pose, renders the artificial reality content.

Application co-processors 124 include various processors such as a video processing unit, graphics processing unit (GPU), digital signal processors (DSPs), encoders and/or decoders, and/or others. In accordance with the techniques described in this disclosure, all or portion(s) of a backend shell may be implemented in hardware, software, or a combination of hardware and software. For example, the backend shell of a concurrent application engine may be executed on co-application processors 124. A plurality of artificial reality applications may be concurrently executed on co-application processors 124, in some examples.

Display SoCs 126A and 126B each represent display controllers for outputting artificial reality content on respective displays, e.g., displays 138A, 138B (collectively, "displays 138"). In this example, display SoC 126A may include a display controller for display 138A to output artificial reality content for a left eye 140A of user 8. In the example of FIG. 4, display SoC 126A includes a decryption block 142A, a decoder block 144A, a display controller 146A, and a pixel driver 148A for outputting artificial reality content on display 138A. Similarly, display SoC 126B includes a display controller for display 138B to output artificial reality content for a right eye 140B of user 8. In the example of FIG. 4, display SoC 126B includes a decryption unit 142B, a decoder 144B, a display controller 146B, and/or a pixel driver 148B for generating and outputting artificial reality content on display 138B. Displays 138 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

Peripheral device 6 includes peripheral SoC 4 and application SOC 106 configured to support an artificial reality application. In this example, peripheral SoC 4 comprises functional blocks including security logic 60, interface 88, tracking 90, security processor 86, and display processor 104. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98").

For example, peripheral device 6 may receive input from one or more accelerometers (quantified in IMUs) that output data indicative of current acceleration of peripheral device 6, GPS sensors that output data indicative of a location of peripheral device 6, radar or sonar that output data indicative of distances of peripheral device 6 from various objects, or other sensors that provide indications of a location or orientation of peripheral device 6 or other objects within a physical environment. Peripheral device 6 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 6 and, in accordance with the current pose, renders the artificial reality content to HMD 12.

Display processor 104 includes one or more processors such as a video processing unit, graphics processing unit, encoders and/or decoders, and/or others, for rendering artificial reality content to HMD 12. Interface 88 includes one or more interfaces for connecting to functional blocks of HMD SoC 4. As one example, interface 88 may include peripheral component interconnect express (PCIe) slots. HMD SoC 4 may connect with application SoC 106 using interface 88. HMD SoC 4 may connect with one or more communication devices (e.g., radio transmitter) using interface 88 for communicating with other devices, such as HMD 12. Security processor 86 provides secure device attestation and mutual authentication of when pairing peripheral device 6 with devices, e.g., HMD 12, used in conjunction within the artificial reality environment. Security processor 86 may authenticate application SoC 106 of peripheral device 6.

Application SoC 106 includes application co-processors 102 and application processors 108. In this example, co-application processors 102 include various processors, such as a vision processing unit (VPU), a graphics processing unit (GPU), and/or central processing unit (CPU). Application processors 108 may include a processing unit for executing one or more artificial reality applications to generate and render, for example, a virtual user interface to a surface of peripheral device 6 and/or to detect gestures performed by user 8 with respect to peripheral device 6.

Security logic 40 of HMD 12 and security logic 60 of peripheral device 6 are configured to increase resistance to FIAs, in accordance with one or more aspects of this disclosure. Security logic 40 and security logic 60 are designed to act as a surrogate of the critical path length of SoC 2 and SoC 4, respectively. Each of security logic 40, 60 includes a monitoring circuit and a cascaded series of substitution boxes (S-Boxes) having a S-Box cascade circuit delay that is designed to match (or closely match) the computing device critical path length. The S-Box cascade has an expected "loop length" or integer number of clock cycles in which the output of the S-Box cascade returns to an initial value. The monitoring circuit monitors the number of loops required for the cascaded series of S-Boxes to return to the initial value and generates an error signal if the monitored loop length is different from the expected loop length. In some examples, the error signal is received by a mitigation processor that executes one or more processes aimed at mitigating the attack.

Figure 5:
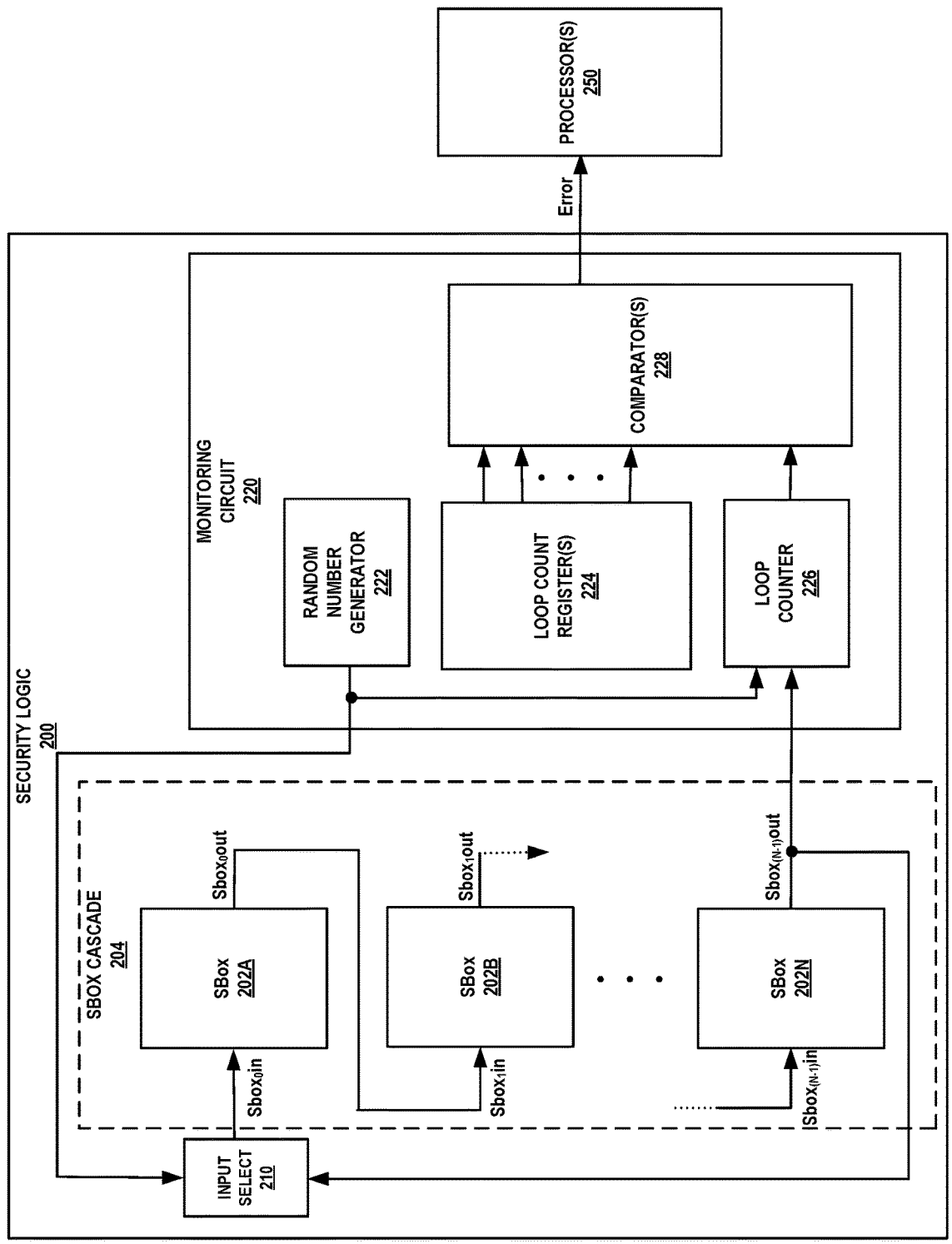
FIG. 5 is a block diagram illustrating example security logic including a cascaded series of S-Boxes and a monitoring circuit, in accordance with one or more aspects of this disclosure.

FIG. 5 is a block diagram illustrating example security logic 200 including a cascaded series of S-Boxes 204 and a monitoring circuit 220, in accordance with one or more aspects of this disclosure. Example S-Box cascade 204 includes one or more 8-bit S-Box units 202A-202N connected in series; that is, the output of each S-Box becomes the input for the next S-Box in the series. N may be any integer number of S-Boxes. Thus, in this example, the output of S-Box 202A (S-Box$_0$out) is the input to S-Box 202B (S-Box$_1$in), the output of S-Box 202B (S-Box$_1$out) is the input to S-Box 202C (S-Box$_2$in), etc., and the output of S-Box 202(N-1) ((S-Box$_{(N-2)}$out) is the input to S-Box 202N (S-Box$_{(N-1)}$in). In addition, the output of the final S-Box (S-Box$_{(N-1)}$out) is fed back to become the input (S-Box$_0$in) to the first S-Box 202A in each loop subsequent to the first loop through S-Box cascade 204.).

The number of S-Boxes 202A-202N is selected such that the expected S-Box cascade circuit delay of the cascaded series of one or more S-Boxes matches (or closely matches) the SoC critical path length. As one example, for a SoC having a system clock frequency of 200 MHz, the SoC critical path length is $\frac{1}{200}$ or 5 nanoseconds (ns). In some examples, the circuit delay of a single S-Box is about 1.5 or 1.6 ns. Therefore, in this example, 3 S-Boxes may be chosen to implement S-Box cascade 204 so that the circuit delay of the cascaded series of 3 S-Boxes is as close as possible to the 5 ns critical path length of the SoC (3×1.5=4.5 ns). In another example, for a SoC having a system clock frequency of 500 MHz, the critical path length is $\frac{1}{500}$ or 2 ns. In that example, S-Box cascade 204 may be implemented with 1 S-Box having a circuit delay of about 1.5 or 1.6 ns to most closely match the 2 ns critical path length of the SoC.

Monitoring circuit 220 includes input select logic 210, a random number generator 222, one or more loop count registers 224, a loop counter 226, and a comparator circuit 228. At the start of each loop, input select logic 210 programs the initial input value to the S-Box cascade as a random number generated by random number generator 222 and waits until the loop completes (that is, returns to the initial random number input value). During each successive iteration of the S-Box cascade, input select logic 210 selects the output of the final S-Box 202N (S-Box$_{(N-1)}$out) to be the input of the first S-Box 202A (S-Box$_0$in) until the loop is complete. After completion of each loop, input select 210 loads a new random number received from the random number generator to begin the next loop.

Monitoring circuit 220 monitors the loop length of S-Box cascade 204 during execution and generates an error signal if the monitored loop length is different from the expected loop length. In some examples, the error signal is received by a mitigation processor 250 that executes one or more processes aimed at mitigating the attack. For example, processor(s) 250 may move an SoC state from an initial state or a secure state to a non-secure state or to a fail state. The mitigation processes may be configurable in accordance with the desired security response of the SoC in the event of a detected error in the S-Box cascade loop length. As some examples, the mitigation processes may include denying an authentication attempt (move an SoC state from an initial state to a non-secure state). The mitigation processes may further include requiring a system power-on-reset (move an SoC state from a secure state to a fail state or from a non-secure state to a fail state).

For purposes of the present disclosure, the "loop length" of S-Box cascade 204 refers to the integer number of clock cycles after which the output of the S-Box cascade circuit (S-Box$_{(N-1)}$out) reaches the initial starting input value. In each clock cycle the S-Box cascade circuit advances one step. For example, the sequence could be 5, 231, 7, 6, 5 for a loop length of 4.

This may further be explained with reference to the example look up table (LUT) implementation of an AES S-Box shown in FIG. 7A. During an initial iteration of S-Box cascade 204 for a loop, random number generator 222 generates an 8-bit output having a randomly generated one of 256 possible values (8-bits=256 possible values). This randomly generated 8-bit value is the initial value selected by input select logic 210 to be an initial value input to a first S-Box 202A in the cascaded series of S-Boxes 204 during an initial iteration of S-Box cascade 204 for the loop.

As a simplified example, assume an example S-Box cascade 204 includes a single S-Box 202A and that the output of the single S-Box is fed back to the input of that same S-Box during each successive iteration of the S-Box cascade. Further to this example, with reference to LUT of FIG. 7A, assume that the randomly generated initial 8-bit value generated by random number generator 222 input to the S-Box is the hexadecimal value "00." The first byte of the 8-bit value refers to the row and the second byte of the 8-bit value refers to the column of the LUT. Therefore, the randomly generated hexadecimal input value "00" gives an output value of "63." The output value is then used as the input to the single S-Box in the next successive clock cycle. For example, the value "63" output at one clock cycle is fed back to the input of the single S-Box and becomes the input value to the S-Box on the next successive clock cycle. Although not shown in the LUT of FIG. 7A, assume the output corresponding to input "63" is "21." This output value "21" becomes the input for the next successive clock cycle, and the corresponding output value for that clock cycle would be "48." This process continues until the S-Box eventually returns back to output "00." The number of clock cycles required for the S-Box cascade to generate an output value equal to the initial randomly generated input value is referred to herein a the "loop length."

Similar to the loop length for a single S-Box, the loop length may also be determined for a cascaded series of one or more S-Boxes. For example, for a cascaded series of 3 S-Boxes, depending on the initial randomly generated 8-bit value, it has been determined in accordance with one or more techniques of this disclosure that 5 different loop lengths are possible: 1, 8, 26, 28 and 58. Security logic 200 leverages the known loop length of S-Box cascade 204 to identify when the monitored S-Box cascade loop length is different from the expected S-Box cascade loop length and generate a corresponding error signal.

Because a voltage, frequency or temperature injected fault is likely to affect the computations of at least one S-Box 202A-202N of S-Box cascade 204, such injected faults will likely affect at least one of the outputs of S-Boxes 202A-202N, causing it to change from an expected output to a fault-injected output. As an example, referring again to the LUT of FIG. 7A, a fault injection may lead to a fault-injected output for input "3f" to be "e1" instead of the correct output of "d4." Because the S-Boxes are connected serially such that the output of one S-Box is input to the next subsequent S-Box in the S-Box cascade, a change from the expected output of one S-Box 202A-202N in S-Box cascade 204 will lead to a different than expected output at each subsequent S-Box stage of the S-Box cascade, thus causing the overall loop length of S-Box cascade 204 to change from the expected loop length.

As described, above, monitoring circuit 220 monitors the loop length of S-Box cascade 204 during execution and generates an error signal if the monitored loop length is different from the expected loop length. Loop count register(s) 224 store 8-bit values corresponding to the one or more expected loop counts for the S-Box cascade 204. In the 3 S-Box cascade example described herein, loop count register(s) 224 store the 5 possible loop length values 1, 8, 26, 28 and 58. At the start of each loop, loop counter 226 receives the initial input value generated by random number generator 222. Loop counter 226 also receives the output of S-Box cascade 204 (Sbox$_{(N-1)}$out) generated at each clock cycle. Upon receipt of each output, loop counter 226 increments a loop count and compares the output of S-Box cascade with the initial input value.

When the output of S-Box cascade is equal to the initial input value, the current loop count becomes the monitored loop count. The monitored loop count is input to comparator(s) 226. Comparator(s) 226 compare the monitored loop count with each of the expected loop counts stored in loop count registers 224. If the monitored loop count does not equal any of the expected loop counts, comparator 226 activates an error output. If the monitored loop count equals any one of the expected loop counts, comparator 226 does not activate an error output. The error output may be received by, for example, one or more processor(s) 250. In response to receipt of the error output, processors(s) 250 may execute one or more attack mitigation procedures.

Figure 6:
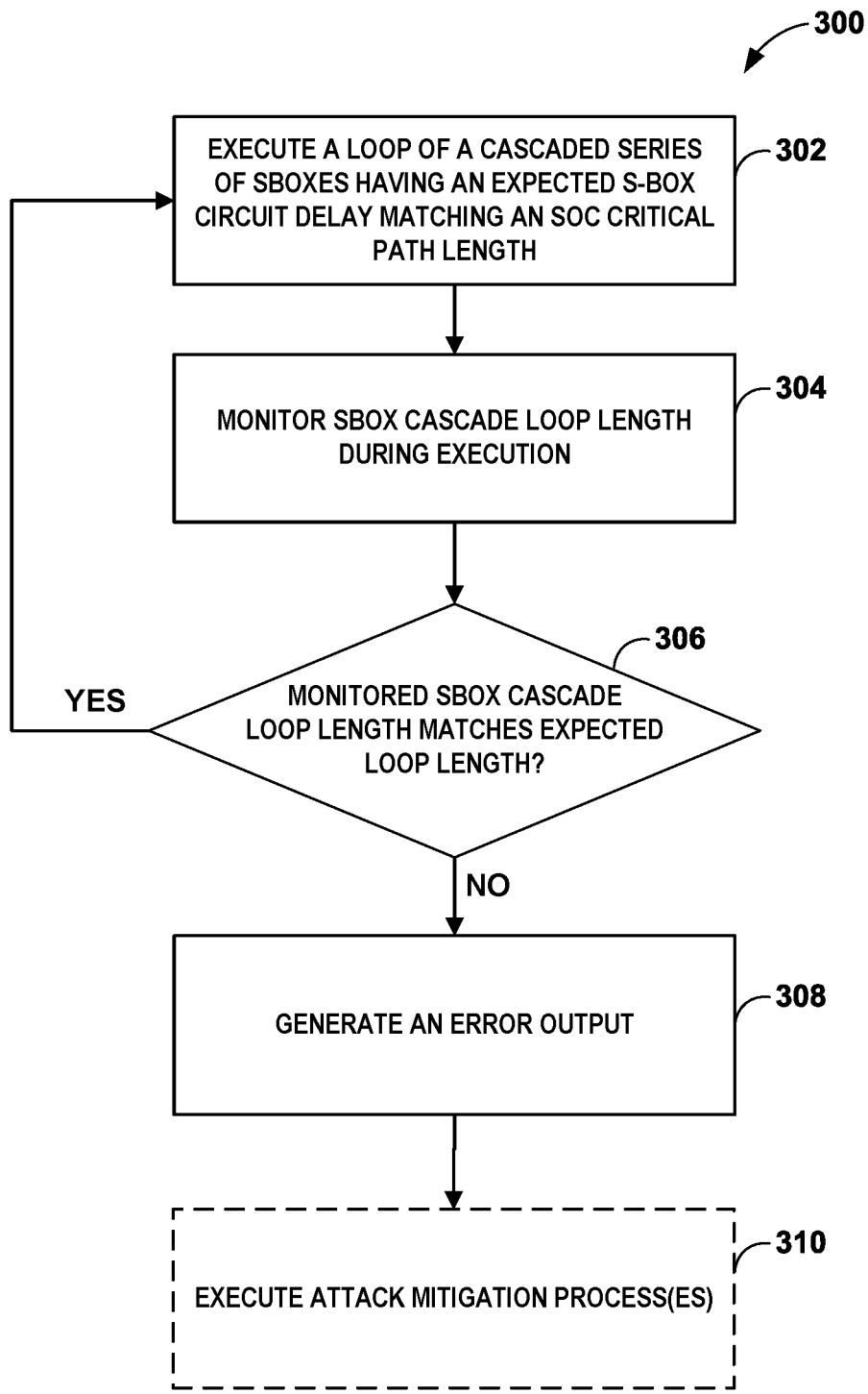
FIG. 6 is a flow chart illustrating an example process by which security logic may monitor a loop length of a cascaded series of S-Boxes and generate an error if the monitored loop length does not match the expected loop length, in accordance with one or more aspects of this disclosure.

FIG. 6 is a flow chart illustrating an example process (300) by which security logic, such as security logic 200 shown in FIG. 5, may monitor a loop length of a cascaded series of S-Boxes and activate an error output if a monitored loop length does not match an expected loop length, in accordance with one or more aspects of this disclosure. Security logic may execute a loop of a cascaded series of S-Boxes having an S-Box cascade circuit delay designed to match (or closely match) an SoC critical path length (302). For example, security logic may randomly generate an initial S-Box cascade input value to a first one of a series of S-Boxes in an S-Box cascade and execute the S-Box cascade based on the initial S-Box cascade input value.

Security logic monitors the S-Box cascade loop length during execution of the S-Box cascade (304). For example, upon completion of each iteration of the S-Box cascade, security logic may generate an S-Box cascade output value, increment a loop count, and compare the S-Box cascade output value to the initial S-Box cascade input value. When the output value of the S-Box cascade is equal to the initial S-Box cascade input value, the monitored S-Box cascade loop length is set to the current loop count.

Security logic 200 determines whether the monitored loop length of the S-Box cascade matches the expected loop length of the S-Box cascade (306). For example, security logic may compare the monitored loop count with each of the possible expected S-Box cascade loop counts. If the monitored loop count does not equal any of the expected loop counts (NO branch of 306), security logic generates an error output (308). The error output may be received by one or more processor(s) for execution of one or more attack mitigation process(es) (310).

If the monitored loop count equals any one of the expected loop counts (YES branch of 306), security logic does not generate an error output, and instead begins executing a next loop of the S-Box cascade to be monitored (302). For example, security logic may initiate execution of another loop of the S-Box cascade by randomly generating an initial S-Box cascade input value to the first one of the series of S-Boxes in the S-Box cascade and execute the S-Box cascade based on the initial S-Box cascade input value.

In some examples, example process (300) may run continuously during operation of an SoC such that faults injected at any particular time may be detected.

Figure 7A:
Figure 7B:
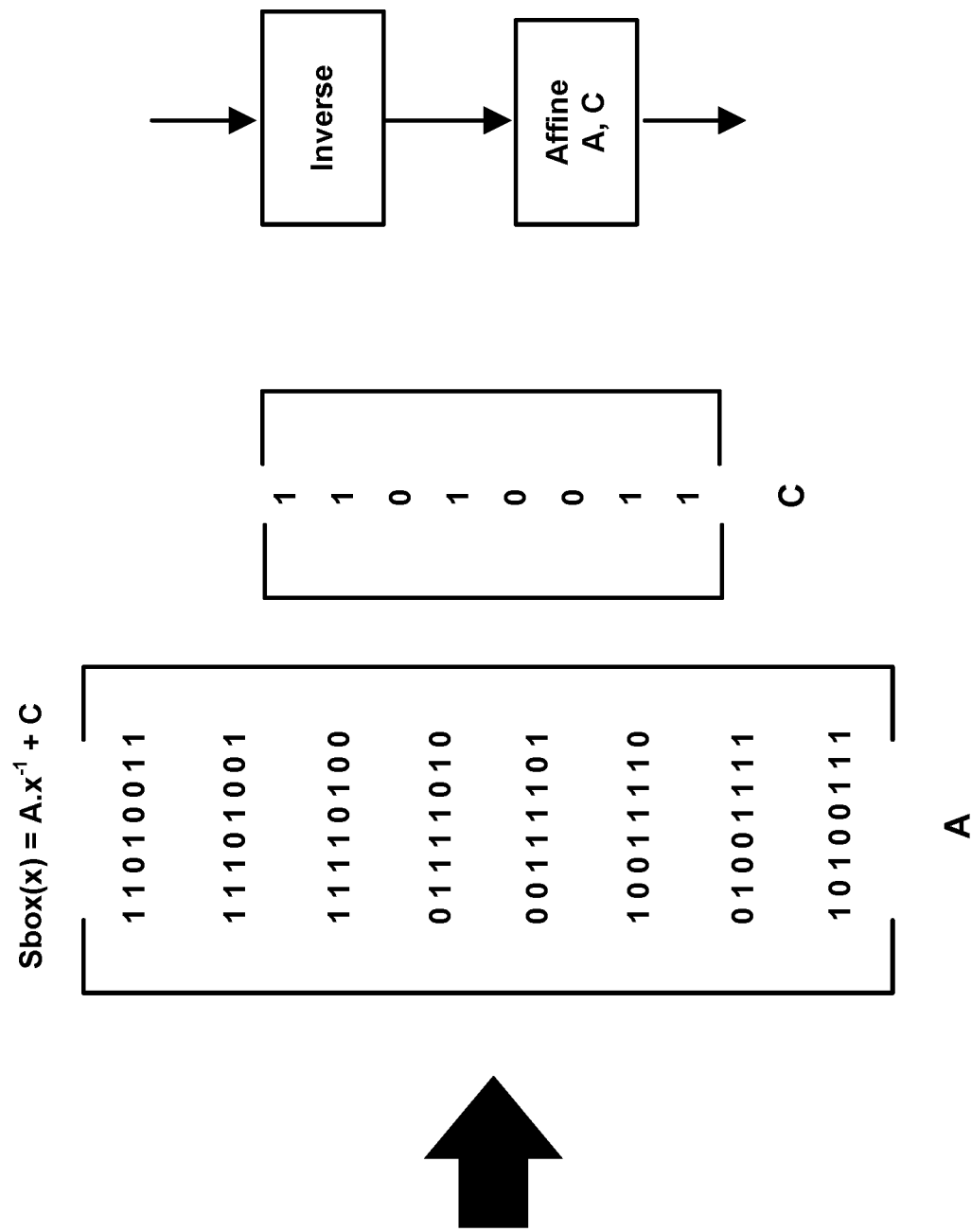

FIGS. 7A-7C illustrate an example look up table (LUT) implementation of an advanced encryption standard (AES)-specified byte substitution (S-Box) and an inverse byte substitution (inverse S-Box). FIG. 7A is a table illustrating a 256$b$ by 8$b$ LUT in accordance with AES-specified S-Box and/or AES-specified inverse S-Box operations. FIG. 7B shows matrix multiplication that forms a portion of an S-Box computational stage, as well as an inversion operation with affine conversion that form a portion of an inverse S-Box computational stage. FIG. 7C illustrates various attributes of the LUT-based S-Box and inverse S-Box stages specified in the AES, such as the field (in this case, a ground field polynomial), the respective matrix multiplication on both the encryption and decryption sides, the number of S-Box units per round (16 in the case of a full round hardware), and the number of S-Box units per key (4 in this case).

According to the LUT-based S-Box implementation of FIGS. 7A-7C, the ground field reduction polynomial is represented by the following equation:

$$GF(2^8) \text{Reduction Poly} = x^8+x^4+x^3+x+1 (1\ 0001\ 1011).$$

Aspects of the matrix multiplication illustrated in FIG. 7B are illustrated by the following equation, which is shown in multiple steps:

Multiply $(2*136)$: $0000\ 0010 * 1000\ 1000 =$ $$x*(x^8+x^3) = x^9+x^4 = x(x^8+x^4+x^3+x+1)+(x^9+x^4) =$$

$$x^5+x^4+x^3+x+1 = 0011\ 1011\ (59).$$

Figures 8A, 8B:
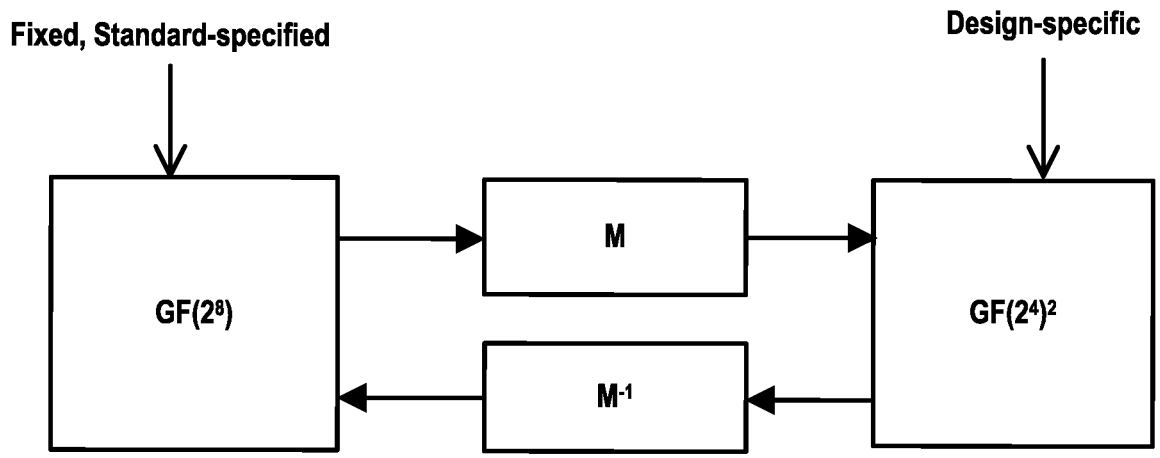
FIGS. 8A & 8B illustrate aspects of a finite-field implementation of byte substitution (S-Box) and inverse byte substitution (inverse S-Box) computational stages, in accordance with one or more aspects of this disclosure.

FIGS. 8A & 8B illustrate aspects of a finite-field implementation of S-Box and inverse S-Box computational stages, in accordance with one or more aspects of this disclosure. FIG. 8A illustrates matrix multiplication that enables an AES S-Box, such as any one of S-Boxes 202A-202N as shown in FIG. 5, to convert the AES-specified 256*b* ground field polynomial to a design-specific pair of 16*b* polynomials, and vice versa. Using the matrix multiplication operations illustrated in FIG. 8A, a S-Box may maintain AES compliance while availing of the reduced computational resource expenditure of finite-field isomorphism. FIG. 8B illustrates the multiplication matrices (M and A) and their respective inverses (M' and A') (for inverse S-Box operation) used, respectively, for ground-field polynomial conversion and for the application of the reduced, design-specific ground field polynomial of the finite-field S-Box of this disclosure. The design-specific ground field polynomial, f(x), and corresponding extension-field polynomial, g(x), (for operating on each 16b segment) are shown as follows:

$$f(x)=x^4+a_3x^3+a_2x^2+a_1x^1+a_0$$

$$g(x)=x^2+\alpha \cdot x+\beta, \beta \in GF(2^4).$$

Using the techniques illustrated in FIGS. 8A & 8B, an S-Box may convert operands from $GF(2^8)$ format to $GF(2^4)^2$ format (with 'GF' denoting a ground-field polynomial). The finite field S-Box transforms the matrices of the LUT-based S-Box and inverse S-Box operations to be applicable in the reduced format $GF(2^4)^2$ of the finite-field implementations. The S-Box leverages the simplified (4b) arithmetic of the finite-field implementations instead of the 8b arithmetic of LUT-based S-Box and inverse S-Box implementations to provide a savings in logical area in the reduced field $GF(2^4)^2$ compared to the $GF(2^8)$ field.

In addition, finite-field implementation of the S-Boxes 202A-202N in S-Box cascade 204 allows for optimization of the path lengths within each S-Box 202A-202N to increase the likelihood that S-Box cascade 204 will experience a failure along at least one computational path, thus causing an incorrect number of loops through the S-Box cascade to be executed and detected, during a fault injection attack.

Figure 9:
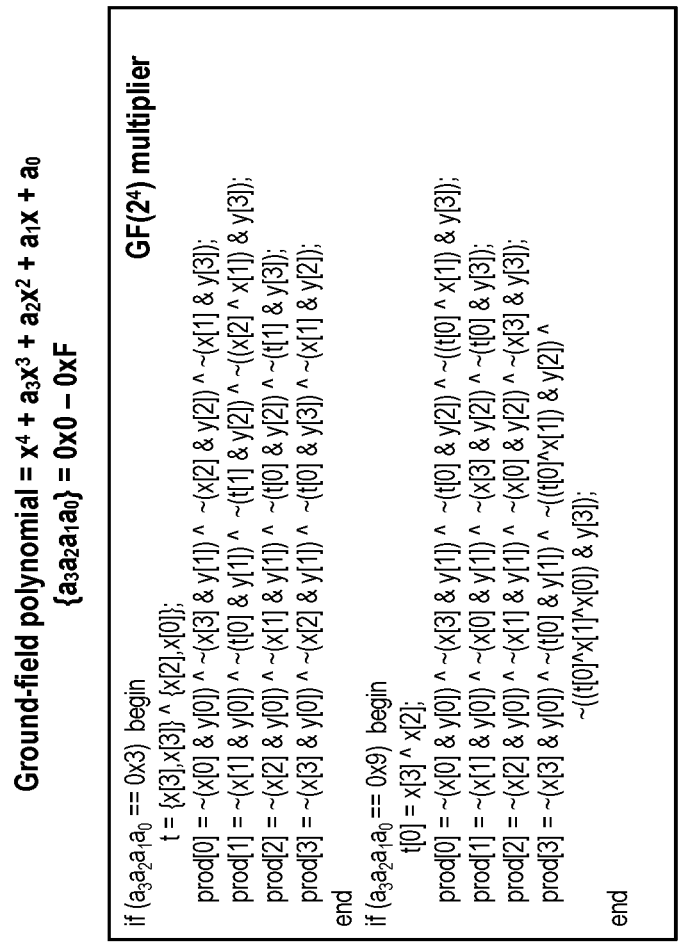
FIG. 9 is a diagram illustrating an example byte substitution (S-Box) unit that may be used to implement one or more S-Boxes in a cascaded series of S-Boxes, in accordance with one or more aspects of this disclosure.
Figure 9:
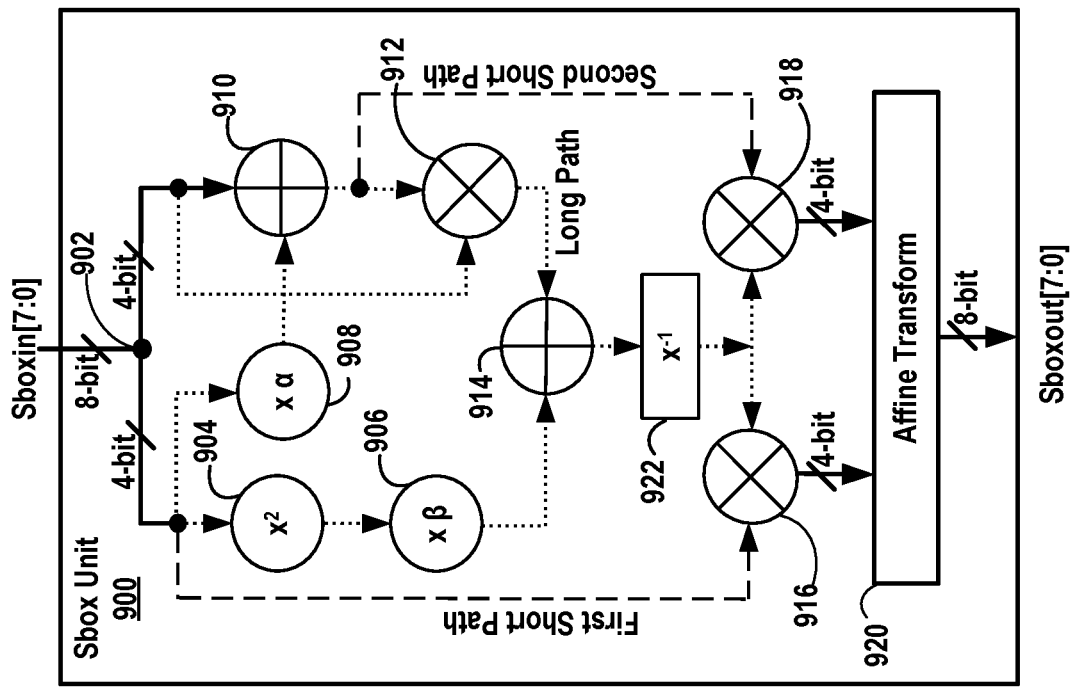

FIG. 9 is a diagram illustrating an example byte substitution box (S-Box) unit 900 that may be used to implement one or more S-Boxes in a cascaded series of S-Boxes, in accordance with one or more aspects of this disclosure. For example, any one or more of S-Boxes 202A-202N in the cascaded series of S-Boxes 204 of security logic 200 as shown in FIG. 5 may be implemented using S-Box unit 900 in accordance with one or more aspects of this disclosure.

According to aspects of this disclosure, S-Box unit 900 implements combinatorial and sequential logic, instead of using a LUT, to perform byte substitution in the S-Box computational stage. In general, AES-defined S-Box operations introduce signal asymmetry, in that parallel signals that form operands for downstream logic elements arrive at the downstream logic elements at different times.

As one example, S-Box unit 900 receives an 8-bit (1-byte) input. S-Box unit 900 bifurcates the 8-bit input into two 4-bit words at bifurcation point 902. Each 4-bit word is pipelined separately, with a different set of operations being performed in each pipeline. The first 4-bit word is first raised exponentially to a power of two by a squaring unit 904, and the squared result is supplied to a first multiplier 906 that uses a constant 'β' as a multiplier. The first 4-bit word is also supplied to a second multiplier 908 that uses a constant 'a' as a multiplier.

The second 4-bit word is supplied to a first adder 910 that adds the second 4-bit word to the output of the second multiplier 908 discussed above. The second 4-bit word is also supplied to a third multiplier 912 that multiplies the second 4-bit word with the output of the first adder 910. In turn, the outputs of the first multiplier 906 and the third multiplier 912 are supplied to a second adder 914, and the output of the second adder 914 is supplied to an inverter 922. The output of inverter 922 is supplied to a first multiplication unit 916 and a second multiplication unit 918.

The first 4-bit word is further supplied to multiplication unit 916, and the output of the first adder 910 is supplied to second multiplication unit 918. As measured from the bifurcation point 902 of the original 8-bit input into the first and second 4-bit words, the inputs to multiplication units 916 and 918 from the bifurcation point 902 and from first adder 910, respectively, traverse a shorter logical path than inputs to multiplication units 916 and 918 from the output from inverter 922. More specifically, the short path logical input to multiplication unit 916 is provided along a first short path directly from the bifurcation point 902 (and therefore does not traverse any logic elements before reaching multiplication unit 916), and the short path logical input to multiplication unit 918 is provided along a second short path from first adder 910 traverses two logic elements (first multiplier 908 and the first adder 910) before reaching multiplication unit 918. In contrast, the inputs to multiplication units 916 and 918 from inverter 922 traverse a longer logical path than the first and second short path logical inputs described above, because the output from inverter 922 passes through seven logic elements (904, 906, 908, 910, 912, 914 and 922), several of which are arranged in series. The first short path traversal from the original bifurcation point 902 to multiplication unit 916 and the second short path traversal from the original bifurcation point 902 to multiplication unit 918 are shown in FIG. 9 using dashed lines, while the long path traversal from the original bifurcation point to multiplication units 916 and 918 is shown using dotted lines.

Multiplication unit 916 generates a 4-bit product by multiplying the two inputs received via the first short path and the long path. Similarly, multiplication unit 918 generates a 4-bit product by multiplying the two inputs received via the long path and the second short path. Multiplication units 916 and 918 supply their respective outputs to an affine transform unit 920, which generates an 8-bit substituted output.

As shown, each of multiplication units 916 and 918 uses the long path-traversed output inverter 922 as one operand, and the first short path-traversed output or the second short path-traversed output, respectively, as the other operand. For this reason, depending upon the values selected for α and/or β, the respective input pairs to each of multiplication units 916 and 918 may exhibit signal asymmetry; that is, each respective input pair includes the single long path input and a respective short path input.

In accordance with one or more aspects of the disclosure, the S-Boxes 202A-202N are designed to optimize the path lengths within each S-Box 202A-202N to increase the likelihood that S-Box cascade 204 will experience a failure along at least one computational path, thus causing an incorrect number of loops through the S-Box cascade to be executed and detected, during a fault injection attack. For example, each of S-Boxes 202A-202N may be designed such that the computational paths through each S-Box are balanced. In other words, each of S-Boxes 202A-202N may be designed such that the path length difference(s) between the computational paths of each S-Box are minimized.

As shown in the right side of FIG. 9, the ground-field polynomial:

$$f(x)=x^4+a_3x^3+a_2x^2+a_1x^1+a_0$$

determines the complexity of multipliers 906, 912, 916, and 918 and inverter 922 of S-Box unit 900. Operands $\{a_3a_2a_1a_0\}$ determine the mapping matrix at the beginning and the inverse mapping circuit at the end of each S-box circuit. More is in those matrices require more logic gates to implement. If a row has all 1s whereas another row has all 0s, the S-Box will include a matrix that is highly unbalanced. Thus, by appropriate selection of operands $\{a_3a_2a_1a_0\}$, multipliers 906, 912, 916, and 918 and inverter 922 may be optimized to provide balanced paths through S-Box unit 900.

By providing balanced paths through each S-Box unit in an S-Box cascade, the techniques of the present disclosure may help ensure that as many paths through the S-Box are as critical as possible; in other words, to help ensure that faults will be detected regardless of which path through the S-Box the fault travels. Any fault injection attacks will slow down the logic and the injected faults do not impact the entirety of the logic in an SoC. Its effect is maximal close to the physical location where voltage or clock is perturbed. If the S-Box is unbalanced, it will have fast (short) paths which when slowed down may go undetected. Hence, the techniques of the present disclosure seek to ensure that as many paths through the S-Box are critical as possible. This happens when the S-box is balanced which will make most paths as long paths, thus balancing out the short and long paths through each S-Box as close as possible to ensure that any injected fault will be detected.

Figure 10B:
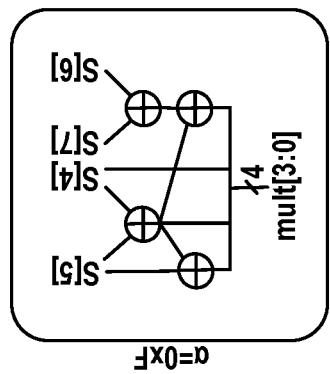
FIG. 10A is a diagram illustrating the example byte substitution (S-Box) unit of FIG. 9, and FIGS. 10B-10E are diagrams illustrating the impact of the extension-field polynomial on S-Box complexity, in accordance with one or more aspects of this disclosure.
Figure 10C:
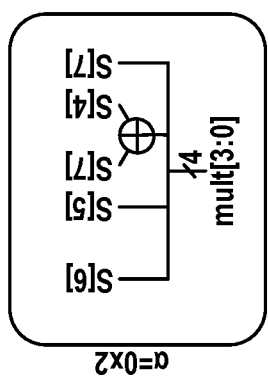
Figure 10D:
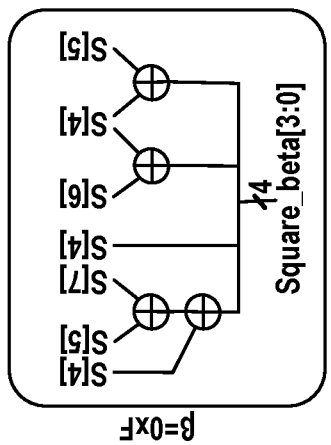
Figure 10E:
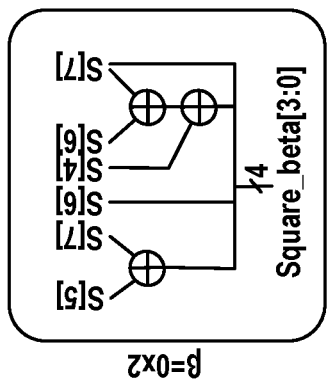
Figure 10A:
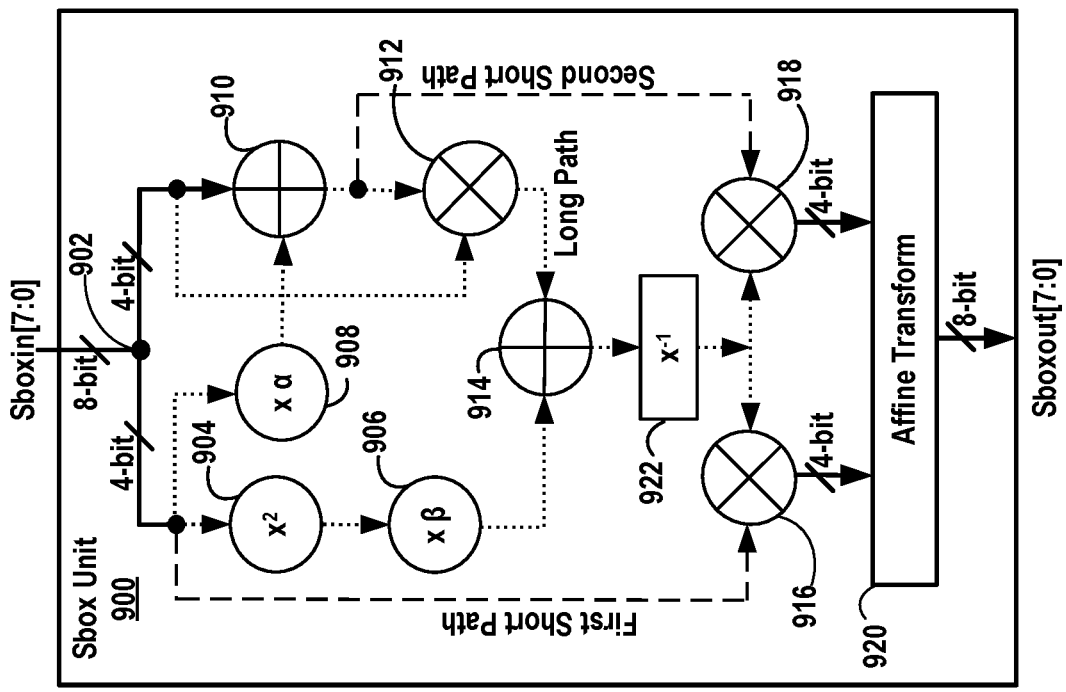

FIG. 10A is a diagram illustrating the example byte substitution (S-Box) unit 900 of FIG. 9 and indicating impact of the extension-field polynomial on S-Box complexity in accordance with one or more aspects of this disclosure. As in FIGS. 10B-10E, the extension-field polynomial:

$$g(x)=x^2+\alpha \cdot x+\beta, \beta \in GF(2^4)$$

impacts the complexity of the S-Box as a whole.

For example, values for $\alpha$ and/or $\beta$ may be selected to optimize the path lengths within each S-Box 202A-202N so as to provide "balanced" paths within each S-Box. This may increase the likelihood that S-Box cascade 204 will experience a failure along at least one computational path during a fault injection attack. The failure will result in an incorrect loop length for S-Box cascade 204, which may then be detected and reported by the monitoring circuit. In addition, because the initial input to the S-Box cascade 204 is randomly generated, the same attack will fail in different ways when repeated making it challenging for the adversary to develop a consistent attack set-up for all SoCs.

FIGS. 10B-10E illustrate the different path lengths within an S-Box 900 that may result from selection of various values for the parameters $\alpha$ and/or $\beta$. As shown in FIG. 10B, for example, selection of $\alpha$=0x2 results in 4 logical paths through a multiplier circuit, wherein the first, second, and fourth logical paths do not include any gates, and the third logical path includes one gate. The so-called "path disparity" for a circuit may be calculated based on the logical path(s) having the highest number of gates as compared to the logical path(s) having the lowest number of gates. The path disparity for the multiplier circuit of FIG. 10B is therefore equal to 1 (1−0=1). As another example, for the circuit of FIG. 10C, selection of $\alpha$=0xf results in 4 logical paths through the multiplier circuit, wherein the first and second logical paths include one gate, the third logical path includes zero gates, and the fourth logical path includes two gates. The path disparity for the circuit of FIG. 10B is therefore equal to 2 (2−0=2).

Similarly, as shown in FIG. 10D, for example, selection of $\beta$=0x2 results in 4 logical paths through a multiplier circuit, wherein the first logical path includes one gate, the second and fourth logical paths do not include any gates, and the third logical path includes two gates. The path disparity for the multiplier circuit of FIG. 10D is therefore equal to 2 (2−0=2). As another example, for the circuit of FIG. 10E, selection of $\beta$=0xf results in 4 logical paths through the multiplier circuit, wherein the first logical path includes two gates, the second logical path includes zero gates, and the third and fourth logical paths include one gate. The path disparity for the circuit of FIG. 10E is therefore equal to 2 (2−0=2).

In accordance with one or more aspects of this disclosure, values for $\alpha$ and/or $\beta$ may be selected to optimize the path lengths within each S-Box 202A-202N so as to provide the highest number of "balanced" paths within each S-Box. In the examples of FIGS. 10B-10E, the circuit of FIG. 10B would be selected because the path disparity for that circuit is equal to 1, whereas the path disparity for the circuit of each of FIGS. 10C-10E is equal to 2. Each possible combination of the parameters $\alpha$ and $\beta$ may be tested to determine which values for $\alpha$ and $\beta$ yield an S-Box having the most balanced combination of logical paths. In addition, in other examples, depending on how imbalanced the rest of the circuit is and what is the target delay, it is possible that an imbalance in the multiplier may help balance out an imbalance in downstream or upstream logic.

By selecting $\alpha$ and $\beta$ parameter values to result in an S-Box having balanced logical paths, the likelihood that at least one of the logical paths in the S-Box will experience an error during a fault injection attack is increased. Increasing the likelihood that the S-Box circuit will fail during a fault injection attack, further increases the likelihood that the attack will be detected and reported so that attack mitigation processes may be invoked.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
   security logic implemented in circuitry comprising:
   a substitution-box (S-Box) cascade including one or more S-Boxes connected in series, wherein a number of S-Boxes in the S-Box cascade is selected such that a circuit delay of the S-Box cascade matches an SoC critical path length; and
   a monitor circuit including:
      a random number generator that generates an initial random value for input to a first one of the one or more S-Boxes in the S-Box cascade for an initial iteration of the S-Box cascade;
      a loop count register that stores one or more predetermined loop counts for the S-Box cascade;
      a loop counter circuit that receives an output value generated by a last one of the one or more S-Boxes in the S-Box cascade upon completion of each iteration of the S-Box cascade, increments a loop counter upon receipt of each output value, and compares the received output value to the initial random value generated by the random number generator; and
      a comparator that, in response to a determination by the loop counter circuit that the received output value is equal to the initial random value, compares a current value of the loop counter to each of the predetermined loop counts and generates an error signal when the current value of the loop counter does not equal any of the predetermined loop counts.

2. The SoC of claim 1, further including at least one processor that, in response to receipt of the error signal generated by the comparator when the current value of the loop counter does not equal any of the predetermined loop counts, executes one or more attack mitigation processes.

3. The SoC of claim 1, wherein each S-Box in the S-Box cascade includes a plurality of logical paths, and wherein one or more parameters of each S-Box are selected to provide substantially balanced gate counts for the plurality of logical paths.

4. The SoC of claim 1, wherein each S-Box in the S-Box cascade includes a plurality of logical paths, and wherein one or more parameters of each S-Box are selected such that a gate count path disparity for the plurality of logical paths is minimized.

5. The SoC of claim 1, wherein an output of a last one of the one or more S-Boxes in the S-Box cascade is connected to a first input of a first one of the one or more S-Boxes in the S-Box cascade.

6. The SoC of claim 1, wherein each S-Box is an advanced encryption standard (AES) S-Box, wherein each S-Box in the S-Box cascade includes a plurality of logical paths, and wherein at least one of an $\alpha$ parameter and a $\beta$ parameter of each S-Box are selected to provide substantially balanced gate counts for the plurality of logical paths.

7. The SoC of claim 1, wherein the SoC has a system clock frequency of 200 Megahertz (MHz) and the S-Box cascade includes three S-Boxes connected in series.

8. The SoC of claim 7, wherein the one or more predetermined loop counts for the S-Box cascade includes 1, 8, 26, 28, and 58.

9. The SoC of claim 1, further including at least one processor that, in response to receipt of the error signal generated by the comparator when the current value of the loop counter does not equal any of the predetermined loop counts, executes one or more attack mitigation processes, wherein the attack mitigation processes include at least one of an authentication denial or a power-on-reset.

10. The SoC of claim 1, wherein the SoC is integrated into one of a head-mounted device (HMD) of an artificial reality system or a peripheral device of the artificial reality system.

11. A head-mounted device (HMD) comprising:
    a system on a chip (SoC) comprising:
    security logic comprising:
    a substitution-box (S-Box) cascade including one or more S-Boxes connected in series, wherein an output of a last one of the one or more S-Boxes in the S-Box cascade is connected to a first input of a first one of the one or more S-Boxes in the S-Box cascade, and further wherein a number of S-Boxes in the S-Box cascade is selected such that a circuit delay of the S-Box cascade most closely matches an SoC critical path length; and a monitor circuit including:

a random number generator that generates an initial random value for input to the first one of the one or more S-Boxes in the S-Box cascade for an initial iteration of the S-Box cascade;

a loop count register that stores one or more predetermined loop counts for the S-Box cascade;

a loop counter circuit that receives an output value generated by the last one of the one or more S-Boxes in the S-Box cascade upon completion of each iteration of the S-Box cascade, increments a loop counter upon receipt of each output value, and compares the received output value to the initial random value generated by the random number generator; and a comparator that, in response to a determination by the loop counter circuit that the received output value is equal to the initial random value, compares a current value of the loop counter to each of the predetermined loop counts and generates an error signal when the current value of the loop counter does not equal any of the predetermined loop counts.

12. The HMD of claim 11, wherein each S-Box in the S-Box cascade includes a plurality of logical paths, and wherein one or more parameters of each S-Box are selected to provide substantially balanced gate counts for the plurality of logical paths.

13. The HMD of claim 11, wherein each S-Box is an advanced encryption standard (AES)S-Box.

14. The HMD of claim 11, wherein each S-Box is an advanced encryption standard (AES)S-Box, wherein each S-Box in the S-Box cascade includes a plurality of logical paths, and wherein at least one of an $\alpha$ parameter and a $\beta$ parameter of each S-Box are selected to provide substantially balanced gate counts for the plurality of logical paths.

15. The HMD of claim 11, further including at least one processor that, in response to receipt of the error signal generated by the comparator when the current value of the loop counter does not equal any of the predetermined loop counts, executes one or more attack mitigation processes, wherein the attack mitigation processes include at least one of an authentication denial or a power-on-reset.

16. A peripheral device comprising:
a system on a chip (SoC) comprising:
security logic comprising:
a substitution-box (S-Box) cascade including one or more S-Boxes connected in series, wherein an output of a last one of the one or more S-Boxes in the S-Box cascade is connected to a first input of a first one of the one or more S-Boxes in the S-Box cascade, and further wherein a number of S-Boxes in the S-Box cascade is selected such that a circuit delay of the S-Box cascade most closely matches an SoC critical path length; and a monitor circuit including:

a random number generator that generates an initial random value for input to the first one of the one or more S-Boxes in the S-Box cascade for an initial iteration of the S-Box cascade;

a loop count register that stores one or more predetermined loop counts for the S-Box cascade;

a loop counter circuit that receives an output value generated by the last one of the one or more S-Boxes in the S-Box cascade upon completion of each iteration of the S-Box cascade, increments a loop counter upon receipt of each output value, and compares the received output value to the initial random value generated by the random number generator; and a comparator that, in response to a determination by the loop counter circuit that the received output value is equal to the initial random value, compares a current value of the loop counter to each of the predetermined loop counts and generates an error signal when the current value of the loop counter does not equal any of the predetermined loop counts.

17. The peripheral device of claim 16, wherein each S-Box in the S-Box cascade includes a plurality of logical paths, and wherein one or more parameters of each S-Box are selected to provide substantially balanced gate counts for the plurality of logical paths.

18. The peripheral device of claim 16, wherein each S-Box is an advanced encryption standard (AES)S-Box.

19. The peripheral device of claim 16, wherein each S-Box is an advanced encryption standard (AES)S-Box, wherein each S-Box in the S-Box cascade includes a plurality of logical paths, and wherein at least one of an $\alpha$ parameter and a $\beta$ parameter of each S-Box are selected to provide substantially balanced gate counts for the plurality of logical paths.

20. The peripheral device of claim 16, further including at least one processor that, in response to receipt of the error signal generated by the comparator when the current value of the loop counter does not equal any of the predetermined loop counts, executes one or more attack mitigation processes, wherein the attack mitigation processes include at least one of an authentication denial or a power-on-reset.

* * * * *